(12) United States Patent
Xu et al.

(10) Patent No.: US 12,437,377 B2
(45) Date of Patent: Oct. 7, 2025

(54) DYNAMIC RANGE MAPPING METHOD AND APPARATUS

(71) Applicant: HUAWEI TECHNOLOGIES CO., LTD., Guangdong (CN)

(72) Inventors: Weiwei Xu, Hangzhou (CN); Quanhe Yu, Beijing (CN); Hu Chen, Munich (DE); Yichuan Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 445 days.

(21) Appl. No.: 17/975,893

(22) Filed: Oct. 28, 2022

(65) Prior Publication Data

US 2023/0054046 A1 Feb. 23, 2023

Related U.S. Application Data

(63) Continuation of application No. PCT/CN2021/089981, filed on Apr. 26, 2021.

(30) Foreign Application Priority Data

Apr. 30, 2020 (CN) .......................... 202010365696.3

(51) Int. Cl.
*G06T 5/92* (2024.01)
*G06V 10/60* (2022.01)
*G09G 3/34* (2006.01)

(52) U.S. Cl.
CPC ................ *G06T 5/92* (2024.01); *G06V 10/60* (2022.01); *G09G 3/3406* (2013.01); *G09G 2320/0626* (2013.01)

(58) Field of Classification Search
CPC ... G06T 5/90; G06T 5/92; G06T 2207/10024; G06T 2207/20208; G06V 10/60; G09G 3/3406; G09G 2320/0626; H04N 9/77
See application file for complete search history.

(56) References Cited

U.S. PATENT DOCUMENTS 8,314,847 B2 11/2012 Brunner
2017/0026646 A1* 1/2017 Minoo ................. H04N 19/182
(Continued)

FOREIGN PATENT DOCUMENTS

CN 1645942 A 7/2005
CN 107211182 A 9/2017
(Continued)

*Primary Examiner* — Stephen G Sherman
(74) *Attorney, Agent, or Firm* — WOMBLE BOND DICKINSON (US) LLP

(57) ABSTRACT

This application provides a dynamic range mapping method and apparatus. The dynamic range mapping method includes: obtaining a display parameter of a terminal device; obtaining feature information of image data; obtaining a first parameter of a first tone mapping curve of the image data; when a preset condition is met, obtaining a second parameter of a second tone mapping curve based on the first parameter, the display parameter of the terminal device, and the feature information of the image data, where output luminance at a first point on the second tone mapping curve is not greater than input luminance at the first point on the second tone mapping curve; and performing dynamic range mapping on the image data based on the second parameter of the second tone mapping curve.

17 Claims, 7 Drawing Sheets

(56) References Cited

U.S. PATENT DOCUMENTS

| | | |
|---|---|---|
| 2017/0034520 A1 | 2/2017 | Rosewarne |
| 2018/0152686 A1 | 5/2018 | Wozniak et al. |
| 2018/0330674 A1 | 11/2018 | Baar et al. |
| 2020/0014897 A1 | 1/2020 | Kim et al. |

FOREIGN PATENT DOCUMENTS

| | | |
|---|---|---|
| CN | 109155844 A | 1/2019 |
| CN | 110867172 A | 3/2020 |
| JP | 2019213144 A | 12/2019 |
| KR | 20190100416 A | 8/2019 |
| WO | 2008136629 A1 | 11/2008 |
| WO | 2014056679 A1 | 4/2014 |
| WO | 2020060980 A1 | 3/2020 |

\* cited by examiner

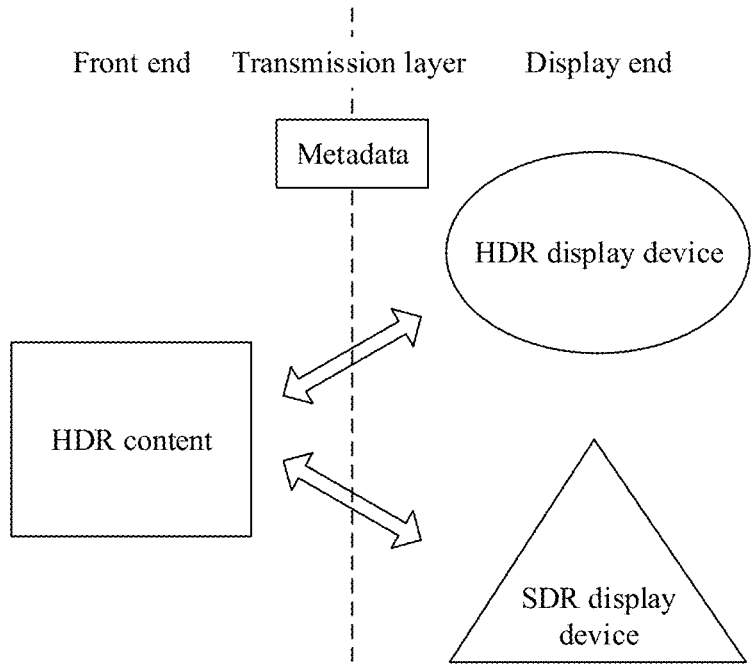

Obtain feature information of image data and a display parameter of a terminal device — 910

Obtain a first parameter of a first tone mapping curve of the image data — 920

When a preset condition is met, obtain a second parameter of a second tone mapping curve based on the feature information, the display parameter, and the first parameter — 930

Perform dynamic range mapping on the image data based on the second parameter of the second tone mapping curve — 940

FIG. 9

DYNAMIC RANGE MAPPING METHOD AND APPARATUS

CROSS-REFERENCE TO RELATED APPLICATIONS

This application is a continuation of International Application No. PCT/CN2021/089981, filed on Apr. 26, 2021, which claims priority to Chinese Patent Application No. 202010365696.3, filed on Apr. 30, 2020. The disclosures of the aforementioned applications are hereby incorporated by reference in their entireties.

TECHNICAL FIELD

This application relates to the field of display technologies, and more specifically, to a dynamic range mapping method and apparatus.

BACKGROUND

A dynamic range (DR) indicates a ratio of a maximum value to a minimum value of a variable in many fields. For a digital image, a dynamic range indicates a ratio of maximum luminance to minimum luminance in a displayable range of the image, that is, a quantity of grayscale levels obtained through division between a "brightest" part and a "darkest" part of the image. A unit of luminance is candela per square meter (cd/m$^2$) or may be represented as nit (nit). A larger dynamic range of an image indicates more luminance levels for representing the image and more realistic visual effect of the image. A dynamic range of a natural scene in the real world is between $10^{-3}$ and $10^6$. The dynamic range is very large, and therefore is referred to as a high dynamic range (HDR). Compared with a high dynamic range image, a common image has a standard dynamic range (SDR) or a low dynamic range (LDR).

Currently, a display device whose dynamic range is less than 0.1 nits to 400 nits is generally referred to as an SDR display device. A display device whose dynamic range is greater than 0.01 nits to 540 nits is generally referred to as an HDR display device. Different high dynamic range display devices display different dynamic ranges, for example, an HDR display device of 0.01 nits to 540 nits and an HDR display device of 0.005 nits to 1000 nits. A dynamic range mapping method is mainly applied to an adaptation process between a front-end HDR signal and a back-end HDR display device, including a tone mapping process from high to low and a tone mapping process from low to high. For example, a front end collects a 4000-nit illumination signal, while a back-end display device has an HDR display capability of only 500 nits. Therefore, mapping the 4000-nit illumination signal to the 500-nit display device is a mapping process from high to low. For another example, a front end collects a 100-nit SDR illumination signal, while a back-end display device has an HDR display capability of 2000 nits. Therefore, mapping the 100-nit illumination signal to the 2000-nit display device is a mapping process from low to high.

In a conventional technology, when maximum luminance of an image is less than maximum display luminance of a display device, a mapping algorithm based on a dynamic range of an "S"-shaped curve may be used to adjust a high dynamic range image to a dynamic range that can be displayed by a display device for display. However, when the maximum luminance of the image is close to the maximum display luminance of the display device, if the foregoing solution is still used, there is an abnormality that luminance of a pixel of a mapped display device is greater than that of an original image. As a result, user experience is affected.

SUMMARY

This application provides a dynamic range mapping method and apparatus, to help avoid, when maximum display luminance of an image is close to maximum display luminance of a display device, an abnormality that luminance of a pixel of a mapped terminal device is greater than that of an original image.

According to a first aspect, a dynamic range mapping method is provided, including:
  obtaining a display parameter of a terminal device;
  obtaining feature information of image data;
  obtaining a first parameter of a first tone mapping curve of the image data;
  when a preset condition is met, obtaining a second parameter of a second tone mapping curve based on the first parameter, the display parameter of the terminal device, and the feature information of the image data, where output luminance at a first point on the second tone mapping curve is not greater than input luminance at the first point on the second tone mapping curve; and
  performing dynamic range mapping on the image data based on the second parameter of the second tone mapping curve.

Therefore, in this embodiment of this application, a parameter of the first tone mapping curve is further adjusted, so that output luminance of a point on a tone mapping curve (that is, the second tone mapping curve) corresponding to an adjusted curve parameter (that is, the second parameter) is not greater than corresponding input luminance of the point. This helps avoid, when maximum display luminance of an image is close to maximum display luminance of a display device, an abnormality that luminance of a pixel of a mapped terminal device is greater than that of an original image.

This embodiment of this application may be applied to a terminal device. The terminal device is, for example, a display device. A product form of the display device may be an electronic device such as a set-top box, a television display device, a mobile phone display device, or a conversion device for live webcasting and video applications. In an example, on a set-top box, a television display device, or a mobile phone display device, a solution provided in this embodiment of this application may be implemented in a form of a hardware chip. On a live webcasting device or a video playback device, a solution provided in this embodiment of this application are mainly implemented in a form of software program code. However, this embodiment of this application is not limited thereto.

For example, the image data may be, for example, an HDR source or an SDR source, for example, pixel data in the image, for example, luminance and color data of each pixel.

For example, the feature information of the image data may be obtained from metadata M of the image data. The metadata M may include, for example, a curve parameter $M_{curve}$ corresponding to the image data, targeted system display actual peak luminance $M_{TPL}$ (targeted system display actual peak luminance), a maximum luminance value MaxSource (maximum values of Y components of all pixels, or a maximum value of maximum values of RGB components of all pixels) of content of the image data, a minimum luminance value MinSource (minimum values of Y components of all pixels, or a minimum value of maximum values of RGB components of all pixels), an average value (an average value of Y components of all pixels, or an average value of maximum values of RGB components of all pixels), and a change range of displayed content. This is not limited in this embodiment of this application.

In some embodiments, the feature information of the image data may be further obtained from pixel information of the image data V. Alternatively, a feature information value of the image data with a preset value is used. This is not limited in this embodiment of this application.

For example, the display parameter $M_{TPL}$ of the terminal device may include maximum display luminance MaxDisplay and/or minimum display luminance MinDisplay of the terminal device, or another parameter. This is not limited in this embodiment of this application.

In an embodiment, the preset condition is met when any one of the following conditions is met:

When tone mapping is performed on the image data based on the first parameter, output luminance at a second point on the first tone mapping curve is greater than input luminance at the second point on the first tone mapping curve.

Alternatively, a parameter $p_{P1}$ in the first parameter is greater than a first value Tp. The first value Tp is obtained based on $a_{P1}$ in the first parameter and a preset correspondence between $a_{P1}$ and $p_{P1}$. Tp indicates a threshold of a curve parameter p. When the first parameter $p_{P1}$ exceeds Tp, output luminance at a point on the second tone mapping curve may be greater than input luminance.

Alternatively, a parameter $a_{P1}$ in the first parameter is greater than a second value Ta. The second value Ta is obtained based on $p_{P1}$ in the first parameter and a preset correspondence between $a_{P1}$ and $p_{P1}$. Ta indicates a threshold of a curve parameter a. When the first parameter $a_{P1}$ exceeds Ta, output luminance at a point on the second tone mapping curve may be greater than input luminance.

Alternatively, a product of a parameter $a_{P1}$ and a parameter $p_{P1}$ in the first parameter is greater than a third value Tap. The third value Tap is a preset rational number. When the product of the parameter $a_{P1}$ and the parameter $p_{P1}$ in the first parameter exceeds Tap, output luminance at a point on the second tone mapping curve may be greater than input luminance. For example, the third value Tap may be a rational number between 3 and 4, for example, 3.2 or 3.4. This is not limited in this embodiment of this application.

Therefore, in this embodiment of this application, when the preset condition is met, that is, output luminance of a point on the first tone mapping curve is greater than input luminance of the point on the first tone mapping curve when tone mapping is performed on image data based on the first tone mapping curve, a process of generating the second parameter of the second tone mapping curve can be performed.

In an embodiment, the second parameter includes a first linear spline curve parameter. The first linear spline curve parameter includes a slope MB[0][0] of a first linear spline on the second tone mapping curve and/or a maximum value TH3[0] of a luminance value of a range pixel of the first linear spline and/or an intersection point base_offset of the first linear spline and a vertical coordinate axis.

In this embodiment of this application, when dynamic range mapping is performed on the image data based on the second parameter, a straight line part (that is, the first linear spline) may be used to perform tone mapping in a dark region of the image data. In this way, a luminance gain can be controlled. In addition, it is more convenient to control the second parameter to gradually change from a straight line to a straight line y=x. The straight line y=x is equivalent to that output luminance at any point on a tone mapping curve is equal to input luminance. Therefore, in this embodiment of this application, a flicker phenomenon is not likely to be caused for the content with gradient luminance.

In an embodiment, the first parameter includes a second linear spline curve parameter. The second linear spline curve parameter includes a slope MB_mid[0][0] of a second linear spline on the first tone mapping curve and/or a maximum value TH3_mid[0] of a luminance value of a range pixel of the second linear spline. The display parameter includes maximum display luminance MaxDisplay of the terminal device. The feature information includes a maximum luminance correction value max_lum of the image data.

The obtaining a second parameter of a second tone mapping curve based on the first parameter, the display parameter, and the feature information includes:

adjusting the curve parameters MB_mid[0][0] and TH3_mid[0] based on the maximum display luminance MaxDisplay and the maximum luminance correction value max_lum to obtain the curve parameters MB[0][0] and TH3[0].

Therefore, in this embodiment of this application, the slope MB[0][0] of the first linear spline on the second tone mapping curve and the maximum value TH3[0] of the luminance value of the range pixel of the first linear spline may be obtained based on the slope MB_mid[0][0] of the second linear spline on the first tone mapping curve, the maximum value TH3_mid[0] of the luminance value of the range pixel of the second linear spline, the maximum display luminance MaxDisplay of the terminal device, and the maximum luminance correction value max_lum of the image data.

In an embodiment, the curve parameters MB_mid[0][0] and TH3_mid[0], and the curve parameters MB[0][0] and TH3[0] satisfy the following formulas:

$$MB[0][0]=\min(\max(MB\_mid[0][0]+(1-MB\_mid[0][0])*(WA)^{N1}, MB\_mid[0][0]),1), \text{ and}$$

$$TH3[0]=\min(\max(TH3\_mid[0]+(max\_lum-TH3\_mid[0])*(WA)^{N2}, TH3\_mid[0]),1), \text{ where}$$

$$WA = \frac{\dfrac{MaxDisplay}{max\_lum} - \dfrac{MaxDisplay}{G(MaxDisplay, m\_a\_T)}}{1 - \dfrac{MaxDisplay}{G(MaxDisplay, m\_a\_T)}}, \text{ or}$$

$$WA = \frac{\dfrac{MaxDisplay}{Max\_lum} - \dfrac{H(Max\_lum, m\_a\_T)}{Max\_lum}}{1 - \dfrac{H(Max\_lum, m\_a\_T)}{Max\_lum}}, \text{ where}$$

$$G(L, m\_a) = \left( \frac{K3 \times \left(\dfrac{L-m\_b}{m\_a}\right)^{\frac{1}{m\_m}}}{m\_p - (K1 \times m\_p - K2) \times \left(\dfrac{L-m\_b}{m\_a}\right)^{\frac{1}{m\_m}}} \right)^{\frac{1}{m\_n}}, \text{ or}$$

$$G(L, m\_a) = \left( \frac{K3 \times \left(\dfrac{L}{m\_a}\right)^{\frac{1}{m\_m}}}{m\_p - (K1 \times m\_p - K2) \times \left(\dfrac{L}{m\_a}\right)^{\frac{1}{m\_m}}} \right)^{\frac{1}{m\_n}}.$$

L is an input signal, G(L) is an inverse function of a function H(L) corresponding to a tone mapping curve, m_a, m_b, m_m, m_n, k1, k2, and k3 are curve parameters, G(L, m_a_T) indicates a G(L) value corresponding to an input variable L when a value of a parameter M_a of G(L) is m_a_T, N1 and N2 are rational numbers, max(a, b) indicates calculating a larger value of a and b, min(a, b) indicates calculating a smaller value of a and b, and H(L) is $$H(L) = \text{m\_a} \times \left( \frac{\text{m\_p} \times L^{m\_n}}{(K1 \times \text{m\_p} - K2) \times L^{m\_n} + K3} \right)^{m\_m} + \text{m\_b, or}$$

$$H(L) = \text{m\_a} \times \left( \frac{\text{m\_p} \times L^{m\_n}}{(K1 \times \text{m\_p} - K2) \times L^{m\_n} + K3} \right)^{m\_m}.$$

In an embodiment, the first parameter includes the second linear spline curve parameter. The second linear spline curve parameter includes the slope MB_mid[0][0] of the second linear spline on the first tone mapping curve and/or the maximum value TH3_mid[0] of the luminance value of the range pixel of the second linear spline and/or an intersection point base_offset_mid of the first linear spline and the vertical coordinate axis. The display parameter includes the maximum display luminance MaxDisplay of the terminal device. The feature information includes the maximum luminance correction value max_lum of the image data.

The obtaining a second parameter of a second tone mapping curve based on the first parameter, the display parameter, and the feature information includes:

adjusting the curve parameters MB_mid[0][0], TH3_mid[0], and/or base_offset_mid based on the maximum display luminance MaxDisplay and the maximum luminance correction value max_lum to obtain the curve parameters MB[0][0], TH3[0], and/or base_offset.

In an embodiment, the curve parameters MB_mid[0][0], TH3_mid[0], and/or base_offset_mid, and the curve parameters MB[0][0], TH3[0], and/or base_offset satisfy the following formulas:

MB[0][0]=min(max(MB_mid[0][0]+(1−MB_mid[0][0])*(WA)$^{N1}$,MB_mid[0][0]),1),

TH3[0]=min(max(TH3_mid[0]+(max_lum−TH3_mid[0]*(WA)$^{N2}$,TH3_mid[0]),1), and base_offset=min(max(base_offset_mid*(1−(WA)$^{N3}$),0),base_offset_mid), where $$WA = \frac{\dfrac{\text{MaxDisplay}}{\text{max\_lum}} - \dfrac{\text{MaxDisplay}}{G(\text{MaxDisplay}, \text{m\_a\_T})}}{1 - \dfrac{\text{MaxDisplay}}{G(\text{MaxDisplay}, \text{m\_a\_T})}},$$

$$G(L, \text{m\_a}) = \left( \frac{K3 \times \left( \frac{L - \text{m\_b}}{\text{m\_a}} \right)^{\frac{1}{m\_m}}}{\text{m\_p} - (K1 \times \text{m\_p} - K2) \times \left( \frac{L - \text{m\_b}}{\text{m\_a}} \right)^{\frac{1}{m\_m}}} \right)^{\frac{1}{m\_n}}, \text{ or}$$

$$G(L, \text{m\_a}) = \left( \frac{K3 \times \left( \frac{L}{\text{m\_a}} \right)^{\frac{1}{m\_m}}}{\text{m\_p} - (K1 \times \text{m\_p} - K2) \times \left( \frac{L}{\text{m\_a}} \right)^{\frac{1}{m\_m}}} \right)^{\frac{1}{m\_n}}.$$

L is the input signal, G(L) is the inverse function of the function H(L) corresponding to the tone mapping curve, m_a, m_b, m_m, m_n, k1, k2, and k3 are curve parameters, G(L, m_a_T) indicates the G(L) value corresponding to the input variable L when the value of the parameter M_a of G(L) is m_a_T, N1, N2, and N3 are rational numbers, max(a, b) indicates calculating the larger value of a and b, min(a, b) indicates calculating the smaller value of a and b, and H(L) is $$H(L) = \text{m\_a} \times \left( \frac{\text{m\_p} \times L^{m\_n}}{(K1 \times \text{m\_p} - K2) \times L^{m\_n} + K3} \right)^{m\_m} + \text{m\_b, or}$$

$$H(L) = \text{m\_a} \times \left( \frac{\text{m\_p} \times L^{m\_n}}{(K1 \times \text{m\_p} - K2) \times L^{m\_n} + K3} \right)^{m\_m}.$$

In an embodiment, the second parameter includes a cubic spline curve parameter. The cubic spline curve parameter includes interpolation point values TH1[1], TH2[1], and TH3[1] of a cubic spline on the second tone mapping curve. TH1[1] indicates a minimum value of a luminance value of a first range pixel of the cubic spline. TH2[1] indicates a maximum value of the luminance value of the first range pixel of the cubic spline and a minimum value of a luminance value of a second range pixel of the cubic spline. TH3[1] indicates a maximum value of the luminance value of the second range pixel of the cubic spline.

In an embodiment, the interpolation point values TH1[1], TH2[1], and TH3[1] of the cubic spline are obtained based on the second linear spline curve parameter TH3[0] in the first parameter and preset offset values of correlation values for calculating the interpolation point values TH1[1], TH2[1], and TH3[1] of the cubic spline, as shown in the following:

TH1[1]=TH3[0],

TH2[1]=TH1[1]+B, and

TH3[1]=TH2[1]+C*TH2[1]−D*TH1[1].

B, C, and D are preset values of the correlation values for calculating the interpolation point values TH1[1], TH2[1], and TH3[1] of the cubic spline. B is a preset offset value corresponding to a luminance value of a dark-bright transition region pixel. C and D are preset weighting coefficients corresponding to a luminance value of a bright region pixel.

Therefore, in this embodiment of this application, the interpolation point values TH1[1], TH2[1], and TH3[1] of the cubic spline on the second parameter may be obtained based on the second linear spline curve parameter in the first parameter and the preset offset values of the correlation values for calculating the interpolation point values TH1[1], TH2[1], and TH3[1] of the cubic spline.

In an embodiment, the interpolation point values TH1[1], TH2[1], and TH3[1] of the cubic spline are obtained based on the second linear spline curve parameter TH3[0] in the first parameter and correlation values for calculating the interpolation point values TH1[1], TH2[1], and TH3[1] of the cubic spline, as shown in the following:

TH1[1]=3Spline_TH[i][0][w],

TH2[1]=3Spline_TH[i][0][w]+3Spline_TH_Delta1[i][1][w], and

TH3[1]=3Spline_TH[i][0][w]+3Spline_TH_Delta1[i][1][w]+3Spline_TH_Delta1[i][2][w].

3Spline_TH[i][0][w], 3Spline_TH_Delta1[i][1][w], and 3Spline_TH_Delta1[i][2][w] are the correlation values that are used for calculating the interpolation point values TH1[1], TH2[1], and TH3[1] of the cubic spine and that are extracted from metadata.

Therefore, in this embodiment of this application, the interpolation point values TH1[1], TH2[1], and TH3[1] of the cubic spline on the second parameter may be obtained based on the second linear spline curve parameter in the first parameter and the correlation values that are used for calculating the interpolation point values TH1[1], TH2[1], and TH3[1] of the cubic spline and that are extracted from the metadata.

In an embodiment, a Y coordinate of a linear spline on the second tone mapping curve at TH3[0] is the same as a Y coordinate of the cubic spline on the second tone mapping curve at TH1[1], and a first-order derivative of the linear spline at TH3[0] is the same as a first-order derivative of the cubic spline at TH1[1].

In this way, the linear spline curve in the second tone mapping curve and the cubic spline curve in the second tone mapping curve can be consecutive at TH[1].

In an embodiment, a Y coordinate of a first cubic spline on the second tone mapping curve at TH2[1] is the same as a Y coordinate of a second cubic spline on the second tone mapping curve at TH2[1], and a first-order derivative of the first cubic spline at TH2[1] is the same as a first-order derivative of the second cubic spline at TH2[1].

In this way, a first cubic spline curve and a second cubic spline curve in the second tone mapping curve can be consecutive at TH[2].

In an embodiment, a Y coordinate of the second cubic spline on the second tone mapping curve at TH3[1] is the same as a Y coordinate of a third tone mapping function on the second tone mapping curve at TH3[1], and a first-order derivative of the second cubic spline at TH3[1] is the same as a first-order derivative of the third tone mapping function at TH3[1].

In this way, the second cubic spline curve in the second tone mapping curve and a curve of the third tone mapping function can be consecutive at TH[3].

In an embodiment, the obtaining a first parameter of a first tone mapping curve of the image data includes:
  obtaining the metadata of the image data; and
  determining the first parameter of the first tone mapping curve based on the metadata and the display parameter.

For example, the display device may obtain, based on an average luminance value average_maxrgb, and/or a maximum luminance value MaxSource, and/or a minimum luminance value MinSource of the content of the image data V in the metadata M, and/or maximum display luminance MaxDisplay of the display device, and/or minimum display luminance MinDisplay of the display device, and/or the curve parameter $M_{curve}(p1, p2, \ldots)$, and/or other data, the first parameter of the first tone mapping curve. The first parameter may be represented, for example, as $P1_{curve}(X, p1, p2, \ldots)$. X is an input luminance value, and p1, p2, . . . are curve parameter values.

In an embodiment, the second parameter further includes a linear spline curve parameter. The linear spline curve parameter includes a maximum value TH3C of a luminance value of a range pixel of the first linear spline on the second tone mapping curve and a slope Dark of the first linear spline.

In this embodiment of this application, when dynamic range mapping is performed on the image data based on the second parameter, the straight line part (that is, the first linear spline) may be used to perform tone mapping in the dark region of the image data. In this way, the luminance gain can be controlled. In addition, it is more convenient to control the second parameter to gradually change from the straight line to the straight line y=x. The straight line y=x is equivalent to that output luminance at any point on the tone mapping curve is equal to input luminance. Therefore, in this embodiment of this application, the flicker phenomenon is not likely to be caused for the content with gradient luminance.

In an embodiment, the method further includes:
  obtaining a maximum value TH3C0 of a luminance value of an initial range pixel of the first linear spline;
  obtaining an initial slope Dark(0) of the first linear spline;
  determining a maximum value TH3C of the luminance value of the range pixel based on the maximum value TH3C0 of the luminance value of the initial range pixel; and
  determining the slope Dark based on the initial slope Dark0.

In an embodiment, the obtaining a maximum value TH3C0 of a luminance value of an initial range pixel of the first linear spline includes:
  determining the maximum value TH3C0 of the luminance value of the initial range pixel based on the first parameter, where the first parameter includes a maximum value TH3[0] of a luminance value of a range pixel of the second linear spline on the first tone mapping curve; or
  determining the maximum value TH3C0 of the luminance value of the initial range pixel based on a preset value, where the preset value is, for example, decomposition of dark vision and bright vision, that is, luminance in which responses of a cone cell and a rod cell of a human eye change increase or decrease, for example, 1 nit; or
  determining the maximum value TH3C0 of the luminance value of the initial range pixel based on the metadata of the image data, where the metadata includes feature data of a quantity of dark region pixels in a histogram.

In an embodiment, the obtaining an initial slope Dark0 of the first linear spline includes:
  determining the initial slope Dark0 based on the first parameter, where the first parameter includes the slope MB[0][0] of the second linear spline on the first tone mapping curve; or
  determining the initial slope Dark0 based on a ratio of a fourth value to the maximum value TH3C of the luminance value of the range pixel, where the fourth value is an output value of the first tone mapping curve at the maximum value TH3C of the luminance value of the range pixel; or
  determining the initial slope Dark0 based on a slope value of a preset input value of the first tone mapping curve between 0 and the maximum value TH3C of the luminance value of the range pixel.

In an embodiment, the maximum value TH3C0 of the luminance value of the initial range pixel, the maximum value TH3C of the luminance value of the range pixel, the initial slope Dark0, and the slope Dark satisfy the following formulas:

$$TH3C = TH3C0 + (\text{MaxSource} - TH3C0) * (WA)^{N2},$$

$$\text{Dark} = \text{Dark0} + (1 - \text{Dark0}) * (WA)^{N1},$$

$$WA = \frac{\dfrac{\text{MaxDisplay}}{\text{MaxSource}} - \dfrac{\text{MaxDisplay}}{G(\text{MaxDisplay})}}{1 - \dfrac{\text{MaxDisplay}}{G(\text{MaxDisplay})}}, \text{ or}$$

-continued $$WA = \frac{\frac{MaxDisplay}{MaxSource} - \frac{H(MaxSource)}{MaxSource}}{1 - \frac{H(MaxDisplay)}{MaxSource}}.$$

TH3C is greater than TH3C0 and less than MaxSource. TH3C0 is less than MaxSource. N1 and N2 are rational numbers greater than 0. H(L) is the tone mapping curve. G(L) is the inverse function of H(L).

In an embodiment, the maximum value TH3C0 of the luminance value of the initial range pixel, the maximum value TH3C of the luminance value of the range pixel, the initial slope Dark0, and the slope Dark satisfy the following formulas:

$TH3C=TH3C0+(MaxLum-TH3C0)*(WA)^{N2}$, $DARK=DARK0+(1-DARK0)*(WA)^{N1}$, $$WA = \frac{\frac{MaxDisplay}{max\_lum} - \frac{MaxDisplay}{G(MaxDisplay)}}{1 - \frac{MaxDisplay}{G(MaxDisplay)}}, \text{ or}$$

$$WA = \frac{\frac{MaxDisplay}{Max\_lum} - \frac{H(MaxSource)}{Max\_lum}}{1 - \frac{H(MaxSource)}{Max\_lum}}.$$

MaxLum is an adjustment value of maximum luminance of the image data. TH3C is greater than TH3C0 and less than MaxSource. TH3C0 is less than MaxSource. N1 and N2 are rational numbers greater than 0. H(L) is the tone mapping curve function. G(L) is the inverse function of H(L).

In an embodiment, the second parameter further includes the cubic spline curve parameter. The cubic spline curve parameter includes a minimum value TH1D of a luminance value of a first range pixel of the first cubic spline on the second tone mapping curve.

The method further includes:
determining the minimum value TH1D of the luminance value of the first range pixel based on the maximum value TH3C of the luminance value of the range pixel of the first linear spline on the second tone mapping curve.

In an embodiment, the second parameter further includes the cubic spline curve parameter. The cubic spline curve parameter includes a maximum value TH2D of the luminance value of the first range pixel of the first cubic spline on the second tone mapping curve.

The method further includes:
determining the maximum value TH2D of the luminance value of the first range pixel based on the minimum value TH1D of the luminance value of the first range pixel.

In an embodiment, the determining the maximum value TH2D of the luminance value of the first range pixel based on the minimum value TH1D of the luminance value of the first range pixel includes:
determining the maximum value TH2D of the luminance value of the first range pixel based on the first parameter and the minimum value TH1D of the luminance value of the first range pixel; or
determining the maximum value TH2D of the luminance value of the first range pixel based on a preset rational number and the minimum value TH1D of the luminance value of the first range pixel; or
determining the maximum value TH2D of the luminance value of the first range pixel based on the minimum value TH1D of the luminance value of the first range pixel and the metadata of the image data.

In an embodiment, the minimum value TH1D of the luminance value of the first range pixel of the first cubic spline on the second tone mapping curve is the same as the maximum value TH3C of the luminance value of the range pixel of the first linear spline, output values of the linear spline and the first cubic spline on the second tone mapping curve at TH1D are the same, and first-order derivatives of the first spline and the first cubic spline on the second tone curve at TH1D are the same.

In this way, a linear spline curve in the second tone mapping curve and a cubic spline curve in the second tone mapping curve can be consecutive at TH1D.

In an embodiment, the cubic spline curve parameter further includes a maximum value TH3D of a luminance value of a second range pixel of a second cubic spline on the second tone mapping curve.

The method further includes:
determining the maximum value TH3D of the luminance value of the second range pixel based on the minimum value TH1D of the luminance value of the first range pixel and the maximum value TH2D of the luminance value of the first range pixel.

In an embodiment, the determining the maximum value TH3D of the luminance value of the second range pixel based on the minimum value TH1D of the luminance value of the first range pixel and the maximum value TH2D of the luminance value of the first range pixel includes:
determining third maximum input luminance TH3D based on the minimum value TH1D of the luminance value of the first range pixel, the maximum value TH2D of the luminance value of the first range pixel, and the first parameter; or
determining third maximum input luminance TH3D based on the minimum value TH1D of the luminance value of the first range pixel, the maximum value TH2D of the luminance value of the first range pixel, and the preset rational number; or
determining third maximum input luminance TH3D based on the minimum value TH1D of the luminance value of the first range pixel, the maximum value TH2D of the luminance value of the first range pixel, and the metadata of the image data.

In an embodiment, a minimum value of the luminance value of the second range pixel of the second cubic spline is the same as the maximum value TH2D of the luminance value of the first range pixel of the first cubic spline, output values of the first cubic spline and the second cubic spline at the maximum value TH2D of the luminance value of the range pixel are the same, and first-order derivatives of the first cubic spline and the second cubic spline at the maximum value TH2D of the luminance value of the range pixel are the same.

In this way, the first cubic spline curve and the second cubic spline curve in the second tone mapping curve can be consecutive at TH2D.

In an embodiment, the second parameter further includes a curve parameter of a tone mapping subfunction of the second tone mapping curve. A minimum value of a luminance value of a third range pixel of the tone mapping subfunction is the same as the maximum value TH3D of the luminance value of the second range pixel, output values of the second cubic spline and the tone mapping subfunction at the maximum value TH3D of the luminance value of the second range pixel are the same, and first-order derivatives of the second cubic spline and the tone mapping subfunction at the maximum value TH3D of the luminance value of the second range pixel are the same.

In this way, the second cubic spline curve in the second tone mapping curve and a curve of the tone mapping subfunction can be consecutive at TH3D.

In an embodiment, the first parameter includes $a_{P1}$ and $p_{P1}$. The obtaining a second parameter of a second tone mapping curve based on the first parameter, the display parameter, and the feature information includes:
- obtaining the first value Tp based on $a_{P1}$ and the preset correspondence between $a_{P1}$ and $p_{P1}$;
- if $p_{P1}$ is greater than Tp, replacing $p_{P1}$ in the first parameter with Tp; and
- using the first parameter obtained after replacement as the second parameter.

Therefore, $p_{P1}$ in the first parameter is replaced with Tp, and the first parameter obtained after replacement is used as the second parameter, so that the output luminance at the first point on the second tone mapping curve is not greater than the input luminance at the first point on the second tone mapping curve.

In an embodiment, the first parameter includes $a_{P1}$ and $p_{P1}$. The obtaining a second parameter of a second tone mapping curve based on the first parameter, the display parameter, and the feature information includes:
- obtaining the second value Ta based on $p_{P1}$ and the preset correspondence between $a_{P1}$ and pH;
- if $a_{P1}$ is greater than Ta, replacing $a_{P1}$ in the first parameter with Ta; and
- using the first parameter obtained after replacement as the second parameter.

Therefore, $a_{P1}$ in the first parameter is replaced with Ta, and the first parameter obtained after replacement is used as the second parameter, so that the output luminance at the first point on the second tone mapping curve is not greater than the input luminance at the first point on the second tone mapping curve.

In an embodiment, the first parameter includes $a_{P1}$ and $p_{P1}$. The obtaining a second parameter of a second tone mapping curve based on the first parameter, the display parameter, and the feature information includes:
- if $a_{P1}*p_{P1}$ is greater than the third value Tap, replacing $p_{P1}$ in the first parameter with Tap/$a_{P1}$, or replacing $a_{P1}$ in the first parameter with Tap/$p_{P1}$; and
- using the first parameter obtained after replacement as the second parameter.

Therefore, $p_{P1}$ in the first parameter is replaced with Tap/$a_{P1}$, or $a_{P1}$ in the first parameter is replaced with Tap/$p_{P1}$, and the first parameter obtained after replacement is used as the second parameter, so that the output luminance at the first point on the second tone mapping curve is not greater than the input luminance at the first point on the second tone mapping curve.

According to a second aspect, a dynamic range mapping apparatus is provided, including an obtaining unit, a processing unit, and a mapping unit.

The obtaining unit is configured to obtain a display parameter of a terminal device.

The obtaining unit is further configured to obtain feature information of image data.

The obtaining unit is further configured to obtain a first parameter of a first tone mapping curve of the image data.

The processing unit is configured to: when a preset condition is met, obtain a second parameter of a second tone mapping curve based on the first parameter, the display parameter of the terminal device, and the feature information of the image data. Output luminance at a first point on the second tone mapping curve is not greater than input luminance at the first point on the second tone mapping curve.

The mapping unit is configured to perform dynamic range mapping on the image data based on the second parameter of the second tone mapping curve.

In an embodiment, the preset condition is met when any one of the following conditions is met:

When tone mapping is performed on the image data based on the first parameter, output luminance at a second point on the first tone mapping curve is greater than input luminance at the second point on the first tone mapping curve.

Alternatively, a parameter $p_{P1}$ in the first parameter is greater than a first value Tp. The first value Tp is obtained based on $a_{P1}$ in the first parameter and a preset correspondence between $a_{P1}$ and $p_{P1}$.

Alternatively, a parameter $a_{P1}$ in the first parameter is greater than a second value Ta. The second value Ta is obtained based on $p_{P1}$ in the first parameter and a preset correspondence between $a_{P1}$ and $p_{P1}$.

Alternatively, a product of a parameter $a_{P1}$ and a parameter $p_{P1}$ in the first parameter is greater than a third value Tap. The third value Tap is a preset rational number.

In an embodiment, the second parameter includes a first linear spline curve parameter. The first linear spline curve parameter includes a slope MB[0][0] of a first linear spline on the second tone mapping curve and/or a maximum value TH3[0] of a luminance value of a range pixel of the first linear spline and/or an intersection point base_offset of the first linear spline and a vertical coordinate axis.

In an embodiment, the first parameter includes a second linear spline curve parameter. The second linear spline curve parameter includes a slope MB_mid[0][0] of a second linear spline on the first tone mapping curve and/or a maximum value TH3_mid[0] of a luminance value of a range pixel of the second linear spline. The display parameter includes maximum display luminance MaxDisplay of the terminal device. The feature information includes a maximum luminance correction value max_lum of the image data.

The processing unit is configured to:
adjust the curve parameters MB_mid[0][0] and TH3_mid[0] based on the maximum display luminance MaxDisplay and the maximum luminance correction value max_lum to obtain the curve parameters MB[0][0] and TH3[0].

In an embodiment, the curve parameters MB_mid[0][0] and TH3_mid[0], and the curve parameters MB[0][0] and TH3[0] satisfy the following formulas:

$MB[0][0]=\min(\max(MB\_mid[0][0]+(1-MB\_mid[0][0])*(WA)^{N1}, MB\_mid[0][0]),1)$, and $TH3[0]=\min(\max(TH3\_mid[0]+(\max\_lum-TH3\_mid[0])*(WA)^{N2}, TH3\_mid[0]),1)$, where $$WA = \frac{\frac{MaxDisplay}{max\_lum} - \frac{MaxDisplay}{G(MaxDisplay, m\_a\_T)}}{1 - \frac{MaxDisplay}{G(MaxDisplay, m\_a\_T)}},$$

$$WA = \frac{\frac{MaxDisplay}{max\_lum} - \frac{H(max\_lum, m\_a\_T)}{max\_lum}}{1 - \frac{H(max\_lum, m\_a\_T)}{max\ lum}},$$

-continued $$G(L, m\_a) = \left( \frac{K3 \times \left( \frac{L - m\_b}{m\_a} \right)^{\frac{1}{m\_m}}}{m\_p - (K1 \times m\_p - K2) \times \left( \frac{L - m\_b}{m\_a} \right)^{\frac{1}{m\_m}}} \right)^{\frac{1}{m\_n}}, \text{ or}$$

$$G(L, m\_a) = \left( \frac{K3 \times \left( \frac{L}{m\_a} \right)^{\frac{1}{m\_m}}}{m\_p - (K1 \times m\_p - K2) \times \left( \frac{L}{m\_a} \right)^{\frac{1}{m\_m}}} \right)^{\frac{1}{m\_n}}.$$

L is an input signal, G(L) is an inverse function of a function H(L) corresponding to a tone mapping curve, m_a, m_b, m_m, m_n, k1, k2, and k3 are curve parameters, G(L, m_a_T) indicates a G(L) value corresponding to an input variable L when a value of a parameter M_a of G(L) is m_a_T, N1 and N2 are rational numbers, max(a, b) indicates calculating a larger value of a and b, min(a, b) indicates calculating a smaller value of a and b, and H(L) is $$H(L) = m\_a \times \left( \frac{m\_p \times L^{m\_n}}{(K1 \times m\_p - K2) \times L^{m\_n} + K3} \right)^{m\_m} + m\_b, \text{ or}$$

$$H(L) = m\_a \times \left( \frac{m\_p \times L^{m\_n}}{(K1 \times m\_p - K2) \times L^{m\_n} + K3} \right)^{m\_m}.$$

In an embodiment, the first parameter includes the second linear spline curve parameter. The second linear spline curve parameter includes the slope MB_mid[0][0] of the second linear spline on the first tone mapping curve and/or the maximum value TH3_mid[0] of the luminance value of the range pixel of the second linear spline and/or an intersection point base_offset_mid of the first linear spline and the vertical coordinate axis. The display parameter includes the maximum display luminance MaxDisplay of the terminal device. The feature information includes the maximum luminance correction value max_lum of the image data.

The processing unit is configured to:
adjust the curve parameters MB_mid[0][0], TH3_mid[0], and/or base_offset_mid based on the maximum display luminance MaxDisplay and the maximum luminance correction value max_lum to obtain the curve parameters MB[0][0], TH3[0], and/or base_offset.

In an embodiment, the curve parameters MB_mid[0][0], TH3_mid[0], and/or base_offset_mid, and the curve parameters MB[0][0], TH3[0], and/or base_offset satisfy the following formulas:

$MB[0][0] = \min(\max(MB\_mid[0][0] + (1 - MB\_mid[0][0]) * (WA)^{N1}, MB\_mid[0][0]), 1)$, $TH3[0] = \min(\max(TH3\_mid[0] + (max\_lum - TH3\_mid[0]) * (WA)^{N2}, TH3\_mid[0]), 1)$, and $base\_offset = \min(\max(base\_offset\_mid * (1 - (WA)^{N3}), 0), base\_offset\_mid)$, where $$WA = \frac{\frac{MaxDisplay}{max\_lum} - \frac{MaxDisplay}{G(MaxDisplay, m\_a\_T)}}{1 - \frac{MaxDisplay}{G(MaxDisplay, m\_a\_T)}},$$

-continued $$G(L, m\_a) = \left( \frac{K3 \times \left( \frac{L - m\_b}{m\_a} \right)^{\frac{1}{m\_m}}}{m\_p - (K1 \times m\_p - K2) \times \left( \frac{L - m\_b}{m\_a} \right)^{\frac{1}{m\_m}}} \right)^{\frac{1}{m\_n}}, \text{ or}$$

$$G(L, m\_a) = \left( \frac{K3 \times \left( \frac{L}{m\_a} \right)^{\frac{1}{m\_m}}}{m\_p - (K1 \times m\_p - K2) \times \left( \frac{L}{m\_a} \right)^{\frac{1}{m\_m}}} \right)^{\frac{1}{m\_n}}.$$

L is the input signal, G(L) is the inverse function of the function H(L) corresponding to the tone mapping curve, m_a, m_b, m_m, m_n, k1, k2, and k3 are the curve parameters, G(L, m_a_T) indicates the G(L) value corresponding to the input variable L when the value of the parameter M_a of G(L) is m_a_T, N1, N2, and N3 are rational numbers, max(a, b) indicates calculating the larger value of a and b, min(a, b) indicates calculating the smaller value of a and b, and H(L) is $$H(L) = m\_a \times \left( \frac{m\_p \times L^{m\_n}}{(K1 \times m\_p - K2) \times L^{m\_n} + K3} \right)^{m\_m} + m\_b, \text{ or}$$

$$H(L) = m\_a \times \left( \frac{m\_p \times L^{m\_n}}{(K1 \times m\_p - K2) \times L^{m\_n} + K3} \right)^{m\_m}.$$

In an embodiment, the second parameter includes a cubic spline curve parameter. The cubic spline curve parameter includes interpolation point values TH1[1], TH2[1], and TH3[1] of a cubic spline on the second tone mapping curve. TH1[1] indicates a minimum value of a luminance value of a first range pixel of the cubic spline. TH2[1] indicates a maximum value of the luminance value of the first range pixel of the cubic spline and a minimum value of a luminance value of a second range pixel of the cubic spline. TH3[1] indicates a maximum value of the luminance value of the second range pixel of the cubic spline.

In an embodiment, the interpolation point values TH1[1], TH2[1], and TH3[1] of the cubic spline are obtained based on the second linear spline curve parameter TH3[0] in the first parameter and preset offset values of the interpolation point values TH1[1], TH2[1], and TH3[1], as shown in the following:

$TH1[1] = TH3[0]$, $TH2[1] = TH1[1] + B$, and $TH3[1] = TH2[1] + C*TH2[1] - D*TH1[1]$.

B, C, and D are preset values of correlation values for calculating the interpolation point values TH1[1], TH2[1], and TH3[1] of the cubic spline. B is a preset offset value corresponding to a luminance value of a dark-bright transition region pixel. C and D are preset weighting coefficients corresponding to a luminance value of a bright region pixel.

In an embodiment, the interpolation point values TH1[1], TH2[1], and TH3[1] of the cubic spline are calculated based on the second linear spline curve parameter TH3[0] in the first parameter and correlation values for calculating the interpolation point values TH1[1], TH2[1], and TH3[1], as shown in the following:

$TH1[1]=3\text{Spline\_}TH[i][0][w],$ $TH2[1]=3\text{Spline\_}TH[i][0][w]+3\text{Spline\_}TH\text{\_Delta1}[i][1][w]$, and $TH3[1]=3\text{Spline\_}TH[i][0][w]+3\text{Spline\_}TH\text{\_Delta1}[i][1][w]+3\text{Spline\_}TH\text{\_Delta1}[i][2][w].$ 3Spline_TH[i][0][w], 3Spline_TH_Delta1[i][1][w], and 3Spline_TH_Delta1[i][2][w] are the correlation values that are used for calculating the interpolation point values TH1[1], TH2[1], and TH3[1] and that are extracted from metadata.

In an embodiment, a Y coordinate of a linear spline on the second tone mapping curve at TH3[0] is the same as a Y coordinate of the cubic spline on the second tone mapping curve at TH1[1], and a first-order derivative of the linear spline at TH3[0] is the same as a first-order derivative of the cubic spline at TH1[1].

In an embodiment, a Y coordinate of a first cubic spline on the second tone mapping curve at TH2[1] is the same as a Y coordinate of a second cubic spline on the second tone mapping curve at TH2[1], and a first-order derivative of the first cubic spline at TH2[1] is the same as a first-order derivative of the second cubic spline at TH2[1].

In an embodiment, a Y coordinate of the second cubic spline on the second tone mapping curve at TH3[1] is the same as a Y coordinate of a third tone mapping function on the second tone mapping curve at TH3[1], and a first-order derivative of the second cubic spline at TH3[1] is the same as a first-order derivative of the third tone mapping function at TH3[1].

In an embodiment, the obtaining unit is specifically configured to:

obtain the metadata of the image data; and determine the first parameter of the first tone mapping curve based on the metadata and the display parameter.

According to a third aspect, a computer-readable storage medium is provided. The computer-readable storage medium stores instructions. When the instructions are run on a computer, the computer is enabled to perform the method according to the first aspect.

According to a fourth aspect, a computer program product including instructions is provided. When the computer program product runs on a computer, the computer is enabled to perform the method according to the first aspect.

According to a fifth aspect, an electronic device is provided, including the dynamic range mapping apparatus according to the second aspect.

It should be understood that for beneficial effects achieved in the second to the fifth aspects and the corresponding implementations of this application, refer to beneficial effects achieved in the first aspect and the corresponding implementations of this application. Details are not described again.

BRIEF DESCRIPTION OF DRAWINGS

FIG. 8 is a schematic diagram of a system architecture according to an embodiment of this application;

FIG. 9 is a schematic flowchart of a dynamic range mapping method according to an embodiment of this application;

DESCRIPTION OF EMBODIMENTS

The following describes technical solutions of this application with reference to accompanying drawings.

First, related concepts and technologies in embodiments of this application are briefly described.

1. A dynamic range indicates a ratio of a maximum value to a minimum value of a variable in many fields. For a digital image, a dynamic range indicates a ratio of maximum luminance to minimum luminance in a range in which the image can be displayed. A dynamic range in nature is quite large. For example, luminance of a night scene in the starry sky is about 0.001 cd/m², and luminance of the sun is up to 1,000,000,000 cd/m². Herein, cd/m² (candela per square meter) is the derived unit of luminance in the international system of units. Therefore, the dynamic range in nature reaches an order of magnitude of $1,000,000,000/0.001=10^{13}$.

Figure 1:
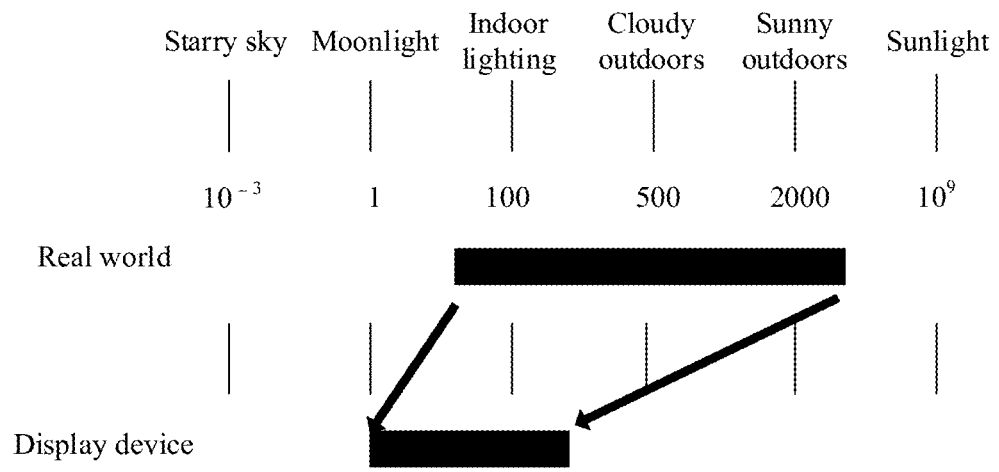
FIG. 1 is an example of low dynamic mapping from a high dynamic range of the real world to a display device.

However, in a real scene in nature, the luminance of the sun and the luminance of a star are not obtained at the same time. For a natural scene in the real world, a dynamic range is from $10^{-3}$ to $10^6$. This dynamic range is quite large, and therefore is usually referred to as a high dynamic range (HDR). Compared with the high dynamic range, a dynamic range for a common image is referred to as a low dynamic range (LDR) or a standard dynamic range (SDR). Therefore, it may be understood that an imaging process of a digital camera is actually a mapping process from a high dynamic range of the real world to a low dynamic range of a photo. FIG. 1 shows an example of low dynamic mapping from a high dynamic range of the real world to a display device.

A larger dynamic range of an image indicates more scene details displayed in the image, more luminance levels and more realistic visual effect. For a conventional digital image, one pixel value is generally stored by using one-byte (that is, 8-bit) space. For a high dynamic range image, one pixel value is stored by using a plurality of bytes of a floating point number, and therefore a high dynamic range for a natural scene can be represented.

In an optical digital imaging process (for example, an imaging process of a digital camera), optical radiation in a real scene is converted into an electrical signal by using an image sensor, and the electrical signal is stored in a form of a digital image. Image display aims to reproduce, by using a display device, a real scene described by a digital image. An ultimate objective of the optical digital imaging process and the image display is to enable a user to obtain visual perception the same as that obtained when the user directly observes the real scene.

However, a luminance level that can be presented by optical radiation (optical signal) for the real scene is almost linear. Therefore, the optical signal is also referred to as a linear signal. However, in a process of converting the optical signal into an electrical signal in optical digital imaging, not every optical signal corresponds to one electrical signal. In addition, an electrical signal obtained through conversion is non-linear. Therefore, the electrical signal is also referred to as a non-linear signal.

2. An optical electro transfer function (OETF) represents a conversion relationship between a linear signal and a nonlinear signal of an image pixel.

Before the advent of a camera capable of capturing an HDR image, a conventional camera can only record captured light information within a specific range by controlling an exposure value. Because maximum illumination information of a display device cannot reach luminance information of the real world, and the display device is used to browse an image, an optical electro transfer function is required. An early display device is a cathode ray tube (CRT) display, and an optical electro transfer function of the cathode ray tube display is a Gamma function. The optical electro transfer function based on the "Gamma" function is defined in the international telecommunication union-radio communication sector (ITU-R) recommendation BT.1886 standard, as shown in the following formula (1):

$$V = 1.099 e^{0.45} - 0.099 \, f \text{ or } 1 \geq L \geq 0.018$$

$$V = 4.500 \, f \text{ or } 0.018 > L \geq 0 \quad (1).$$

An image obtained after quantization into 8 bits through the foregoing conversion is a conventional SDR image. The SDR image and the transfer function in the foregoing formula (1) perform well on a conventional display device (illumination is about 100 cd/m²).

A display device is continuously upgraded. Compared with a conventional display device, a current display device can display a dynamic range that continuously increases. An existing consumer-level HDR display can have a display range of up to 600 cd/m², and a high-end HDR display can have a display range of up to 2000 cd/m², which are far beyond a display range of a conventional SDR display device. Therefore, in the ITU-R BT.1886 standard protocol, an optical electro transfer function adapting to the conventional SDR display device cannot well represent display performance of a current HDR display device. Therefore, it is necessary to improve the optical electro transfer function to adapt to upgrading of the HDR display device.

An HDR optical electro transfer function (OETF) mainly includes the following three types: a perceptual quantizer (PQ) optical electro transfer function, a hybrid log-gamma (HLG) optical electro transfer function, and a scene luminance fidelity (SLF) optical electro transfer function. The three optical electro transfer functions are specified in an audio video coding standard (AVS).

Figure 2:
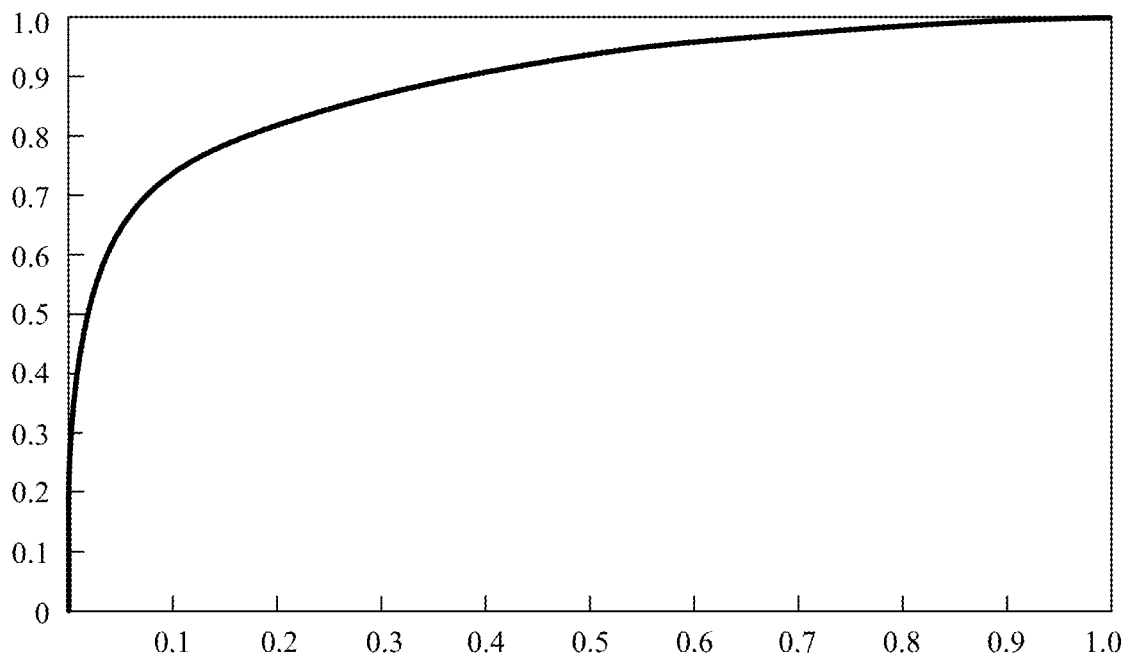
FIG. 2 is a diagram of an PQ optical electro transfer function.

The PQ optical electro transfer function is a perceptual quantizer optical electro transfer function provided based on a luminance perception model for human eyes. FIG. 2 is a diagram of the PQ optical electro transfer function.

The PQ optical electro transfer function represents a conversion relationship between a linear signal value of an image pixel and a non-linear signal value in a PQ domain. The PQ optical electro transfer function may be represented as a formula (2):

$$\begin{cases} R' = \text{PQ\_TF}(\max(0, \min(R/10000, 1))) \\ G' = \text{PQ\_TF}(\max(0, \min(G/10000, 1))) \\ B' = \text{PQ\_TF}(\max(0, \min(B/10000, 1))) \end{cases} \quad (2)$$

Each parameter in the formula (2) is calculated as follows:

$$L' = \text{PQ\_TF}(L) = \left( \frac{c_1 + c_2 L^{m_1}}{1 + c_3 L^{m_1}} \right)^{m_2}.$$

L represents a linear signal value with a value normalized to [0, 1], L' represents a non-linear signal value with a value range of [0, 1], $m_1$, $m_2$, $c_1$, $c_2$, and $c_3$ are PQ optical electro transfer coefficients, $$m_1 = \frac{2610}{4096} \times \frac{1}{4} = 0.1593017578 \ 125, m_2 = \frac{2523}{4096} \times 128 = 78.84375,$$

$$c_1 = c_3 - c_2 + 1 = \frac{3424}{4096} = 0.8359375,$$

$$c_2 = \frac{2413}{4096} \times 32 = 18.8515625, \text{ and } c_3 = \frac{2392}{4096} \times 32 = 18.6875.$$

Figure 3:
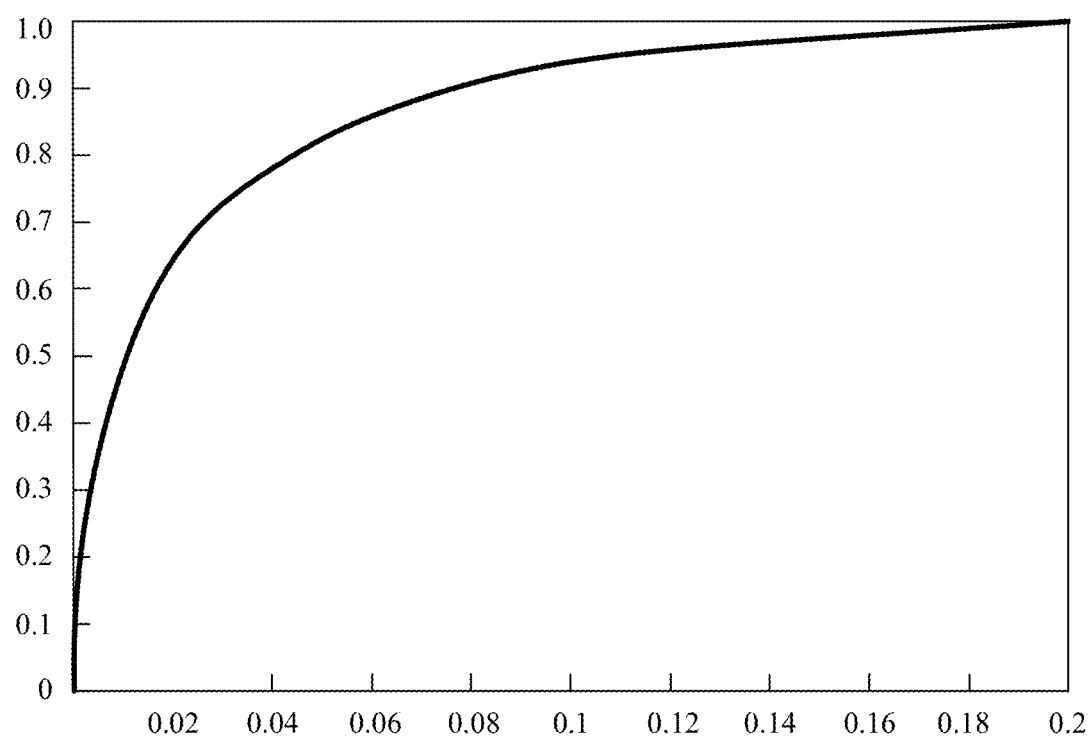
FIG. 3 is a diagram of an HLG optical electro transfer function.

The HLG optical electro transfer function is obtained by improving a conventional gamma curve. FIG. 3 is a diagram of the HLG optical electro transfer function.

For the HLG optical electro transfer function, the conventional gamma curve is used in a low luminance region, and a log curve is supplemented in a high luminance region. The HLG optical electro transfer function represents a conversion relationship between a linear signal value of an image pixel and a non-linear signal value in an HLG domain. The HLG optical electro transfer function may be represented as a formula (3):

$$L' = \text{HLG\_TF}(L) = \begin{cases} \sqrt{L}/2, \, 0 \leq L \leq 1 \\ a \ln(L - b) + c, \, 1 < L \end{cases}. \quad (3)$$

L represents a linear signal value with a value range of [0, 12], L' represents a non-linear signal value with a value range of [0, 1], a, b, and c are HLG optical electro transfer coefficients, a=0.17883277, b=0.28466892, and c=0.55991073.

Figure 4:
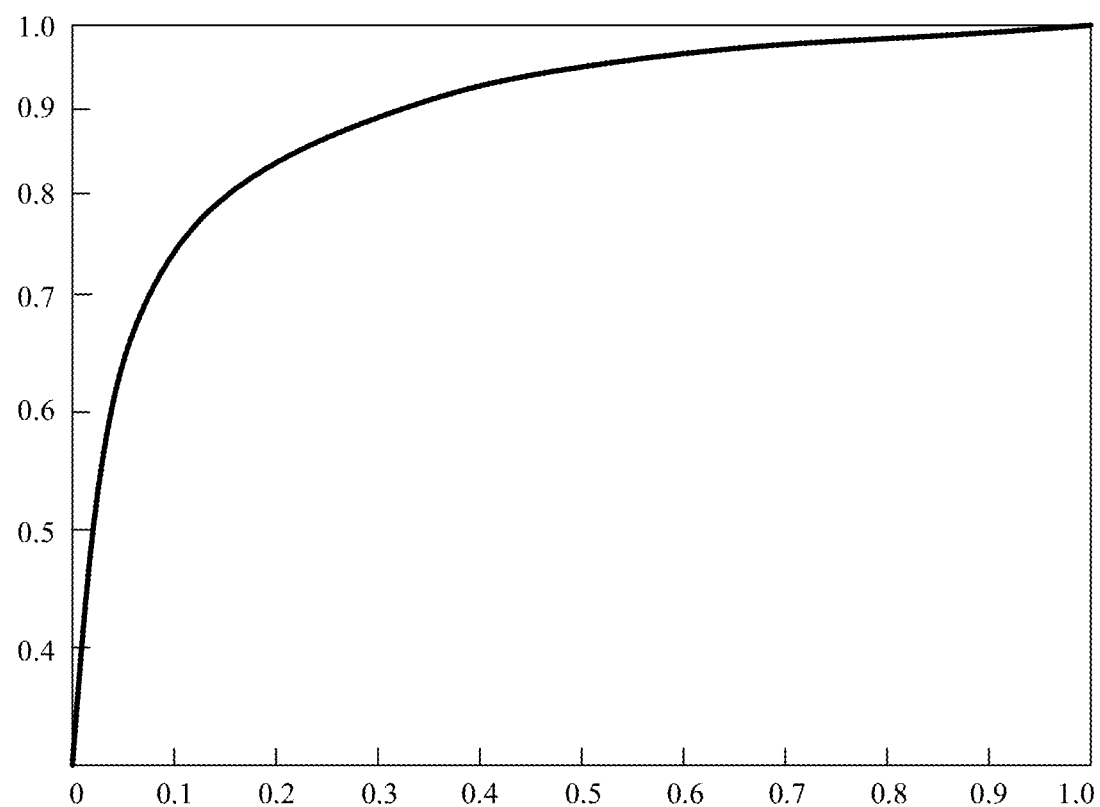
FIG. 4 a diagram of an SLF optical electro transfer function.

The SLF optical electro transfer function is an optimal curve obtained based on luminance distribution in an HDR scene when optical characteristics of human eyes are satisfied. FIG. 4 is a diagram of the SLF optical electro transfer function.

The SLF optical electro transfer curve represents a conversion relationship between a linear signal value of an image pixel and a non-linear signal value in an SLF domain. The conversion relationship between the linear signal value of the image pixel and the non-linear signal value in the SLF domain is shown in a formula (4):

$$\begin{cases} R' = \text{SLF\_TF}(\max(0, \min(R/10000, 1))) \\ G' = \text{SLF\_TF}(\max(0, \min(G/10000, 1))) \\ B' = \text{SLF\_TF}(\max(0, \min(B/10000, 1))) \end{cases} \quad (4)$$

The SLF optical electro transfer function may be represented as a formula (5):

$$L' = \text{SLF\_TF}(L) = a \times \left( \frac{p \times L}{(p-1) \times L} \right)^m + b. \quad (5)$$

L represents a linear signal value with a value normalized to [0, 1], L' represents a non-linear signal value with a value range of [0, 1], p, m, a, and b are SLF optical electro transfer coefficients, p=2.3, m=0.14, a=1.12762, and b=−0.12762.

3. A dynamic range mapping method is mainly applied to an adaptation process between a front-end HDR signal and a back-end HDR display device, including a tone mapping (tone mapping) process from high to low and a tone mapping process from low to high. For example, a front end collects a 4000-nit illumination signal, while a back-end display device (for example, a TV series or a tablet computer) has an HDR display capability of only 500 nits. Therefore, mapping the 4000-nit illumination signal to the 500-nit display device is a tone mapping process from high to low. For another example, a front end collects a 100-nit SDR illumination signal, while a back-end display device has an HDR display capability of 2000 nits. Therefore, mapping the 100-nit illumination signal to the 2000-nit display device is a tone mapping process from low to high.

The dynamic range mapping method may be divided into static dynamic range mapping and dynamic dynamic range mapping. In a static dynamic range mapping method, based on same video content or same hard disk content, an overall tone mapping process is performed by using a single piece of data, that is, a processing curve of the same video content or hard disk content is usually the same. Advantages of this method are that less information is carried, and a processing procedure is relatively simple. A disadvantage of this method is that a same curve is used for performing tone mapping in all scenes, resulting in information loss in some scenes. For example, if a curve focuses on protecting a bright region, some details may be lost or invisible in some extremely dark scenes, which affects user experience.

The dynamic mapping method is to dynamically adjust based on a specific region, each scene, or content of each frame. An advantage of this method is that different curves may be used for processing based on a specific region, each scene, or each frame, and a processed image has a better display result. However, a disadvantage is that each frame or each scene needs to carry related scene information, and a large amount of information is carried.

Currently, there are following five tone mapping technologies. The following describes the five tone mapping technologies.

Figure 5:
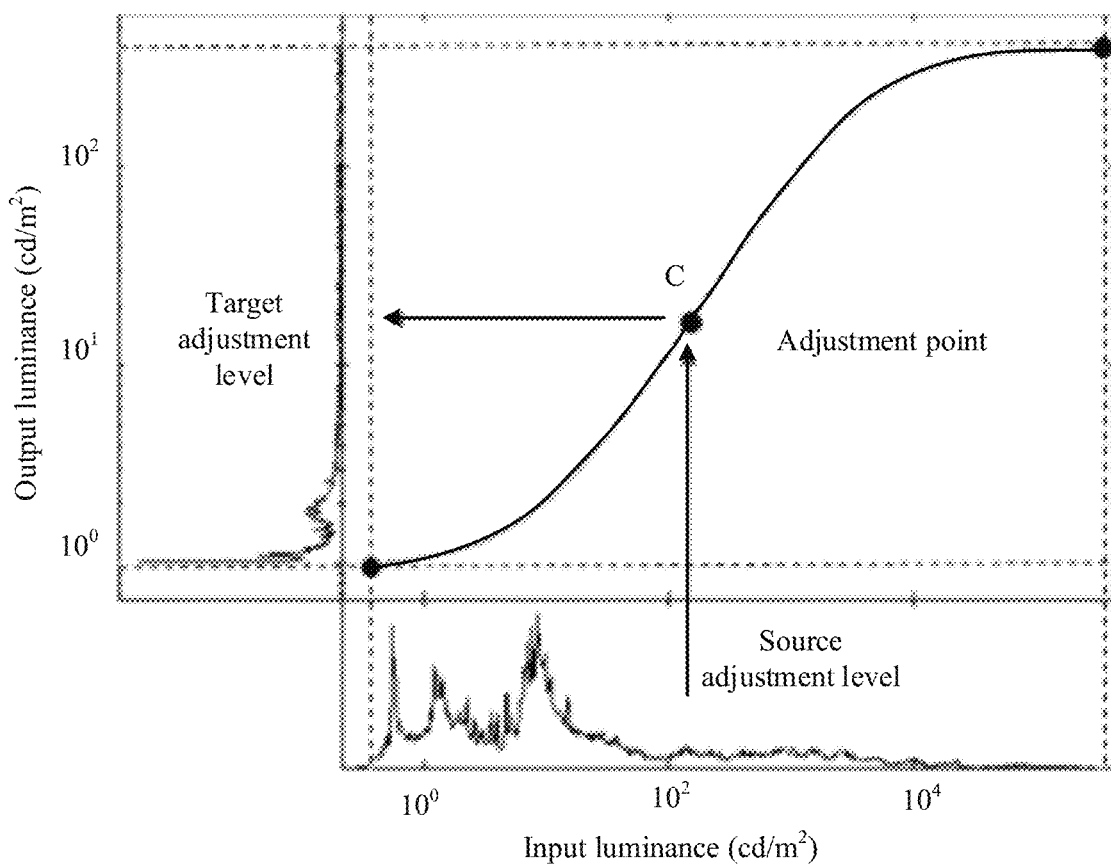
FIG. 5 is a schematic diagram of a sigmoid curve.

Technology 1 is a sigmoid curve-based tone mapping process proposed by Dolby. FIG. 5 is a schematic diagram of a sigmoid curve. Refer to FIG. 5, a horizontal coordinate represents input luminance, that is, luminance of an HDR image before dynamic range adjustment, and a vertical coordinate represents output luminance, that is, luminance of an image obtained after dynamic range adjustment. A shape of the sigmoid curve is an "S" shape, and a slope of the curve first increases and then decreases. For example, an adjustment point on the sigmoid curve is used as an example. By using the sigmoid curve, a source adjustment level (also referred to as a source adaptation level) whose luminance is about 300 cd/m² may be mapped to a target adjustment level (also referred to as a target adaptation level) whose luminance is about 30 cd/m².

Figure 6:
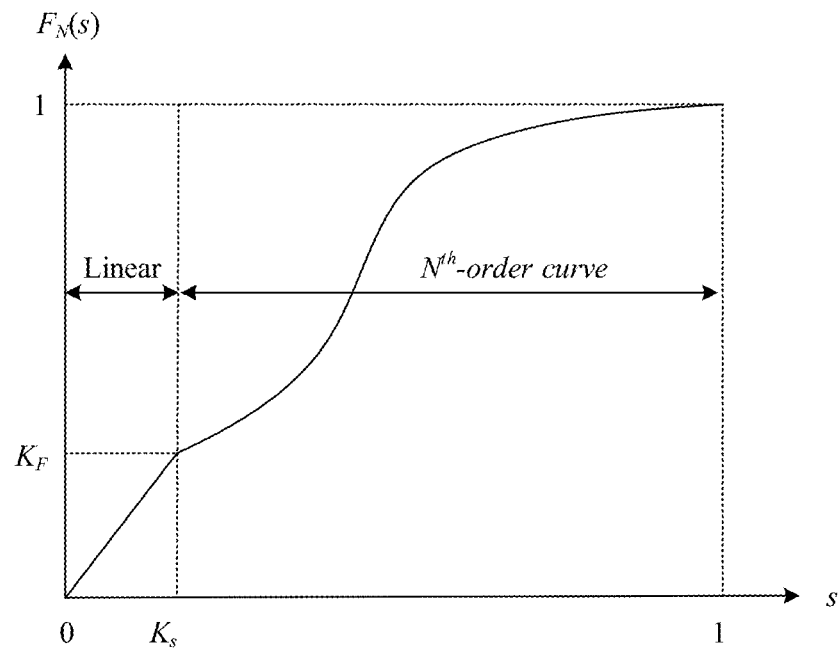
FIG. 6 is a schematic diagram of a Bezier curve.

Technology 2 is a tone mapping process based on a Bezier curve. FIG. 6 is a schematic diagram of the Bezier curve. In FIG. 6, a horizontal coordinate represents input luminance, that is, luminance of an HDR image before dynamic range adjustment, and a vertical coordinate represents output luminance, that is, luminance of an image obtained after dynamic range adjustment. The Bezier curve is a linear mapping process in a range of input luminance from 0 to $K_s$, and is an "S"-shaped curve in a range of input luminance from $K_s$ to 1, and a slope of the curve first increases and then decreases.

Technology 3 is a tone mapping process based on an S-shaped curve perceived by human eyes. A form of the curve is shown in a formula (6):

$$L' = F(L) = a \times \left( \frac{p \times L^n}{(k_1 \times p - k_2) \times L^n + k_3} \right)^m + b. \quad (6)$$

L and L' represent a normalized electrical signal or optical signal, a value of a ranges from 0.0 to 1.0, a value of b ranges from 0.0 to 1.0, values of p, n, and m range from 0.1 to N, N is a rational number greater than 0.1, L' is a rational number ranging from 0.0 to 1.0, L is a rational number ranging from 0.0 to 1.0, and k1, k2, and k3 are rational numbers.

Technology 4 is a tone mapping process combining a cubic spline and an S-shaped curve of a straight line. A form of a part of curve is shown in the following formula (7):

$$L' = F(L) = \begin{cases} MB0 \times L, \; L < TH1[0] \\ MD1[i] \times (L - TH1[i])^3 + MC1[i] \times (L - TH1[i])^2 + MB1[i] \times (L - TH1[i]) + MA1[i], \; TH1[i] \leq L \leq TH2[i] \\ MD2[i] \times (L - TH2[i])^3 + MC2[i] \times (L - TH2[i])^2 + MB2[i] \times (L - TH2[i]) + MA2[i], \; TH2[i] \leq L \leq TH3[i] \; . \\ a \times \left( \frac{p \times L^n}{(k_1 \times p - k_2) \times L^n + k_3} \right)^m + b, \; \text{or others} \end{cases} \quad (7)$$

L and L' are normalized electrical signals or optical signals. A value of a ranges from 0.0 to 1.0, a value of b ranges from 0.0 to 1.0, values of p, n, and m range from 0.1 to N, N is a rational number greater than 0.1, L' is a rational number ranging from 0.0 to 1.0, L is a rational number ranging from 0.0 to 1.0, k1, k2, and k3 are rational numbers, k1 and k2 are not 0 at the same time, and K3 is not 0. TH1[i], TH2[i], and TH3[i] are rational numbers ranging from 0.0 to 1.0.

Technology 5 is another tone mapping process combining a cubic spline and an S-shaped curve of a straight line. A form of a part of curve is shown in the following formula (8):

$$L' = F(L) = \begin{cases} MB0 \times L, \ L < TH1[0] \\ MD1[i] \times (L-TH1[i])^3 + MC1[i] \times (L-TH1[i])^2 + MB1[i] \times (L-TH1[i]) + MA1[i], \ TH1[i] \leq L \leq TH2[i] \\ MD2[i] \times (L-TH2[i])^3 + MC2[i] \times (L-TH2[i])^2 + MB2[i] \times (L-TH2[i]) + MA2[i], \ TH2[i] \leq L \leq TH3[i] \\ a \times \left(\dfrac{p \times L^n}{(k_1 \times p - k_2) \times L^n + k_3}\right)^m + b, \ L < LT \\ MB3 \times L, \ L \geq MAX(TH[i], LT) \end{cases} \quad (8)$$

L and L' are normalized electrical signals or optical signals. A value of a ranges from 0.0 to 1.0, a value of b ranges from 0.0 to 1.0, values of p, n, and m range from 0.1 to N, N is a rational number greater than 0.1, L' is a rational number ranging from 0.0 to 1.0, L is a rational number ranging from 0.0 to 1.0, and k1, k2, and k3 are rational numbers. LT is a preset rational number, and is a rational number ranging from 0.0 to 1.0. TH1[i], TH2[i], and TH3[i] are rational numbers ranging from 0.0 to 1.0.

Metadata related to a curve parameter is sent in dynamic metadata.

For Technology 1, in dynamic metadata definition related to Dolby St2094-10, not only these statistical values, such as a maximum value (maximum PQ-encoded maxRGB), a minimum value (minimum PQ-encoded maxRGB), and an average value (PQ-encoded maxRGB), but also these sigmoid curve-related parameters, such as a tone mapping offset, a tone mapping gain, and tone mapping gamma are sent.

For Technology 2, in dynamic metadata definition related to St2094-40, histogram information (distribution MaxRGB) is included, and a Bezier curve parameter (Bezier curve anchors) is also included for directly generating a curve.

In addition, in St2094 series standards, the metadata includes targeted system display actual peak luminance.

For Technology 3, Technology 4, and Technology 5, information such as a maximum value, a minimum value, and an average value may be transferred in the metadata, and curve parameters such as p, m, a, b, n, K1, K2 and K3 may also be transferred.

When maximum luminance of an image is less than maximum display luminance of a display device, a dynamic range mapping algorithm in Technology 1 to Technology 5 may be used to adjust a high dynamic range image to a dynamic range that can be displayed by the display device for display. However, when the maximum luminance of the image is close to the maximum display luminance of the display device, if the dynamic range mapping algorithm in Technology 1 to Technology 5 is still used, there is an abnormality that luminance of a pixel of a mapped display device is greater than that of an original image.

Figure 7:
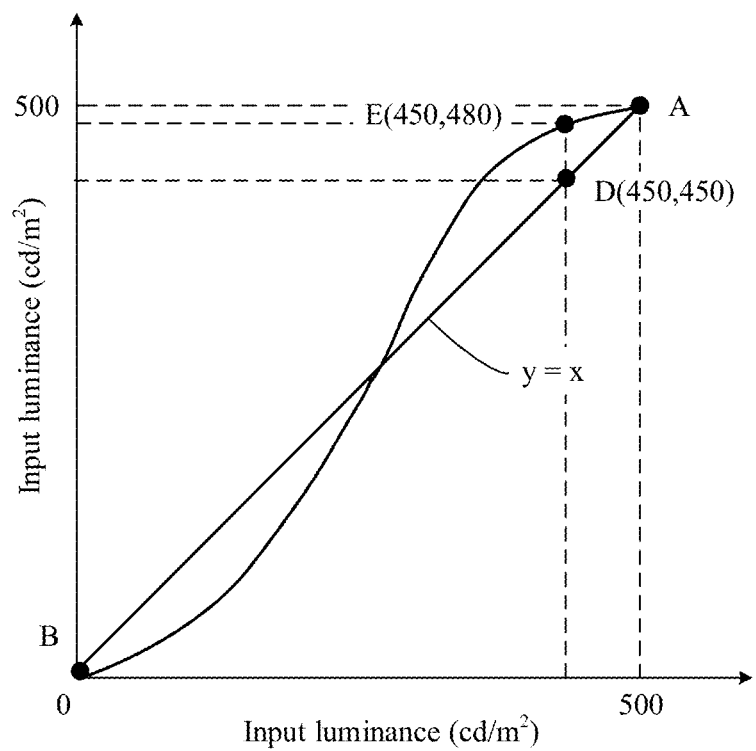
FIG. 7 is an example of a mapping curve when maximum luminance of an image is the same as maximum display luminance of a display device.

FIG. 7 shows an example of a tone mapping curve when the maximum luminance of the image is the same as the maximum display luminance of the display device (for example, both are 500 cd/m²). Refer to FIG. 7, a straight line y=x (two endpoints are respectively A (500, 500) and B (0, 0)) corresponds to a tone mapping curve in which input luminance is the same as output luminance. The luminance of the pixel of the display device is the same as the luminance of the original image based on the straight line y=x. For example, for a point D on y=x, both input luminance and output luminance are 450 cd/m².

Still refer to FIG. 7, for an "S"-shaped curve (two endpoints are respectively A (500, 500) and B (0, 0), for example, the sigmoid curve in Technology 1), when input luminance is close to 500 cd/m², and input luminance is the same, output luminance of tone mapping performed by using the "S"-shaped curve is greater than output luminance of tone mapping performed by using y=x. For example, for a point E on the "S"-shaped curve with same input luminance as the point D, output luminance of the point E is 480 cd/m².

In view of this, this application provides a dynamic range mapping method. When maximum luminance of an image is close to maximum display luminance of a display device, a parameter of an original tone mapping curve is adjusted, so that output luminance of a tone mapping curve corresponding to an adjusted parameter is not greater than input luminance of the tone mapping curve. This helps avoid an abnormality that luminance of a pixel of a mapped display device is greater than that of an original image. Herein, the original tone mapping curve may be a fixed curve that is adjusted based on targeted system display actual peak luminance in metadata of image data, for example, the tone mapping curves in Technology 1 to Technology 5.

FIG. 8 is a schematic diagram of a system architecture of the dynamic range mapping method according to an embodiment of this application. Refer to FIG. 8, a front end may obtain HDR content through collection and production, and send the HDR content and metadata of the HDR content to a display end through a transmission layer. The display end may include an HDR display device and further include an SDR display device. In an example, when the display end includes the HDR display device, the HDR content may be mapped to the HDR display device. When the display end includes the SDR display device, the HDR content may be mapped to the SDR display device.

For example, a product form of the display end may be an electronic device such as a set-top box, a television display device, a mobile phone display device, or a conversion device for live webcasting and video applications.

In an example, on a set-top box, a television display device, or a mobile phone display device, a solution provided in this embodiment of this application may be implemented in a form of a hardware chip. On a live webcasting device or a video playback device, a solution provided in this embodiment of this application are mainly implemented in a form of software program code. However, this embodiment of this application is not limited thereto.

It should be noted that, in this embodiment of this application, only the application scene in FIG. 7 is used as an example for description, but the system architecture applied to this embodiment of this application is not limited thereto. For example, the front end may further obtain SDR content. In this case, when the display end includes the HDR display device, the SDR content may be mapped to the HDR display device.

FIG. 9 is a schematic flowchart of a dynamic range mapping method 900 according to an embodiment of this application. The method 900 is applicable to the application scene provided in FIG. 8, for example, is performed by the display end shown in FIG. 8. Refer to FIG. 9, the method 900 includes the following operations 910 to 940.

In operation 910, feature information of image data and a display parameter of a local display device are obtained. Herein, the image data (which may be represented as V) may be HDR image data or SDR image data. This is not limited in this embodiment of this application.

For example, a display device may receive a video source from the front end. The video source mainly includes image data V, for example, pixel data. In an example, a 4K video source may include luminance and color data of 3840*2160 pixels, and the like.

It should be noted that a format of the image data V is not limited in this embodiment of this application. For example, in terms of a color space of pixel data, the image data V may be image data in a Y (luminance) UV (chrominance) space, or may be image data in an RGB pixel space. For another example, in terms of a bit width of pixel data, the image data V may be a bit width of 8 bits, in other words, a bit width of 10 bits, or a bit width of 12 bits.

In some embodiments, when the image data V is obtained, the feature information of the image data may be further obtained, for example, obtained from metadata M. The metadata M of the image data V indicates a data feature of the image data, for example, may include a format of the image data, or a curve parameter $M_{curve}$ corresponding to the image data V, targeted system display actual peak luminance $M_{TPL}$, a maximum luminance value MaxSource (maximum values of Y components of all pixels, or a maximum value of maximum values of RGB components of all pixels) of content of the image data, a minimum value MinSource (minimum values of Y components of all pixels, or a minimum value of maximum values of RGB components of all pixels), an average value (an average value of Y components of all pixels, or an average value of maximum values of RGB components of all pixels), a change range of displayed content, and the like. This is not limited in this embodiment of this application.

In some embodiments, the feature information of the image data may be further obtained from pixel information of the image data V. Alternatively, a feature information value of the image data with a preset value is used. This is not limited in this embodiment of this application.

It should be noted that when the metadata M includes the curve parameter $M_{curve}$, a format of the curve parameter $M_{curve}$ is not limited in this embodiment of this application. For example, for Technology 3, the curve parameter $M_{curve}$ included in the metadata may be p, m, a, b, n, K1, K2, K3, or the like.

In some embodiments, the metadata includes dynamic metadata and static metadata. Refer to a standard ST2094-1 dynamic metadata for color volume transform or a related standard for static. For example, the metadata may be packaged together with an image, for example, include SEI packages of different file formats and different encoding standards, and some package structures related to an HDMI of hardware.

In some embodiments, the display device may further obtain a display parameter $M_{TPL}$ (which may also be referred to as a display luminance parameter) of the display device (that is, an actual terminal device P or a local display device). For example, the display parameter $M_{TPL}$ may include maximum display luminance MaxDisplay of the display device and minimum display luminance MinDisplay of the display device, or another parameter. This is not limited in this embodiment of this application.

In operation 920, a first parameter of a first tone mapping curve of the image data is obtained.

For example, the display device may obtain the first parameter of the first tone mapping curve of the image data V based on the metadata M of the image data V and the display parameter $M_{TPL}$ of the display device. For example, the first parameter of the first tone mapping curve is obtained based on an average luminance value average_maxrgb, and/or a maximum luminance value MaxSource, and/or a minimum luminance value MinSource of the content of the image data V in the metadata M, and/or the maximum display luminance MaxDisplay of the display device, and/or the minimum display luminance MinDisplay of the display device, and/or the curve parameter $M_{curve}$ (p1, p2, . . . ), and/or other data, and may be represented as $P1_{curve}$ (X, p1, p2, . . . ). X is an input luminance value, and p1, p2, . . . are curve parameter values.

It should be noted that a form of the first parameter $P1_{curve}$ of the first tone mapping curve is not limited in this embodiment of this application. In addition, data used to generate the first parameter $P1_{curve}$ or an algorithm used to generate the first parameter $P1_{curve}$ is not limited in this embodiment of this application. For example, the data used to generate the first parameter $P1_{curve}$ may be metadata, and/or a display parameter of the display device, or may be other preset data.

In an example, for Technology 5, the curve parameter $M_{curve}$ includes, for example, parameter values (p, m, a, b, n, K1, K2, or K3) and (TH1[i], TH2[i], TH3[i], or MB0). The first parameter $P1_{curve}$ (for example, $p_{P1}$, $m_{P1}$, $a_{P1}$, $b_{P1}$, $n_{P1}$, $K1_{P1}$, $K2_{P1}$, $K3_{P1}$, TH1[i], TH2[i], TH3[i], MD1[i], MC1[i], MB1[i], MA1[i], MD2[i], MC2[i], MB2[i], MA2[i], or MB3) of the first tone mapping curve may be obtained based on the curve parameter $M_{curve}$.

In another example, for Technology 4, the curve parameter $M_{curve}$ includes, for example, parameter values (p, m, a, b, n, K1, K2, or K3) and (TH1[i], TH2[i], TH3[i], or MB0). The first parameter $P1_{curve}$ (for example, $p_{P1}$, $m_{P1}$, $a_{P1}$, $b_{P1}$, $n_{P1}$, $K1_{P1}$, $K2_{P1}$, $K3_{P1}$, TH1[i], TH2[i], TH3[i], MD1[i], MC1[i], MB1[i], MA1[i], MD2[i], MC2[i], MB2[i], or MA2[i]) of the first tone mapping curve may be obtained based on the curve parameter $M_{curve}$.

It should be noted that the first tone mapping curve in this embodiment of this application is an example of the foregoing original tone mapping curve, and includes but is not limited to the tone mapping curves used in Technology 1, Technology 2, Technology 3, Technology 4, and Technology 5. The first parameter of the first mapping curve in this application includes but is not limited to parameters related to the tone mapping curves used in Technology 1, Technology 2, Technology 3, Technology 4, and Technology 5.

In operation 930, when a preset condition is met, a second parameter of a second tone mapping curve is obtained based on the feature information, the display parameter, and the first parameter. Output luminance at a first point on the second tone mapping curve is not greater than input luminance at the first point on the second tone mapping curve. That is, within an input luminance range of the second tone mapping curve, output luminance obtained by mapping any input luminance based on the second tone mapping curve is not greater than the input luminance. The second parameter is used to perform dynamic range mapping on the image data, and may be represented as $R_{curve}$.

In an example, input luminance of a tone mapping curve may be linear light, or may be a non-linear value, or may be a value obtained after a linear relationship is normalized (for example, 10000 is used as 1, or maximum luminance of content is used as 1). This is not limited in this embodiment of this application.

For example, the second parameter $R_{curve}$ of the second tone mapping curve may be obtained based on the first parameter $P1_{curve}$, the average luminance value average_maxrgb, and/or the maximum luminance value MaxSource, and/or the minimum luminance value MinSource of the content of the image data V, and/or the maximum display luminance MaxDisplay of the display device, and/or the minimum display luminance MinDisplay of the display device, and/or other data.

For example, the second parameter $R_{curve}$ may have a form shown in the following formula (9):

$$L' = F(L) = \begin{cases} \text{Dark} \times L, L < TH3C \\ MD1D \times (L-TH1D)^3 + MC1D \times (L-TH1D)^2 + MB1D \times (L-TH1D) + MA1D, TH1D \le L < TH2D \\ MD2D \times (L-TH2D)^3 + MC2D \times (L-TH2D)^2 + MB2D \times (L-TH2D) + MA2D, TH2D \le L < TH3D \\ T_{curve}(L), \text{ or others} \end{cases} \quad (9)$$

L and L' are normalized electrical signals or optical signals, and Dark, TH3C, TH2D, TH3D, MD1D, MC1D, MB1D, MA1D, MD2D, MC2D, MB2D and MA2D are rational numbers.

In some embodiments, the preset condition is, for example, that when tone mapping is performed on the image data based on the first tone mapping curve, output luminance of a point on the first tone mapping curve is greater than input luminance of the point on the first tone mapping curve.

It should be noted that, in this embodiment of this application, when a difference between output luminance and input luminance of a tone mapping curve is within a first range, it may be considered that the output luminance and the input luminance are basically the same. In other words, when the output luminance of the tone mapping curve is greater than the input luminance, and the difference between the output luminance and the input luminance is within the first range, it may be considered that the output luminance and the input luminance are basically the same. Otherwise, when the output luminance of the tone mapping curve is greater than the input luminance, and the difference between the output luminance and the input luminance exceeds the first range, it may be considered that the output luminance is greater than the input luminance.

When the preset condition is met, that is, output luminance of the first tone mapping curve is greater than input luminance of the first tone mapping curve when tone mapping is performed on the image data based on the first parameter, a process of generating the second parameter $R_{curve}$ of the second tone mapping curve is performed.

In an embodiment, the preset condition may be that a parameter pH in the first parameter is greater than a first value Tp. The first value Tp is obtained based on $a_{P1}$ in the first parameter and a preset correspondence between $a_{P1}$ and $p_{P1}$. Tp represents a threshold of the curve parameter p in Technology 3, Technology 4, or Technology 5. When the first parameter $p_{P1}$ exceeds Tp, output luminance at a point on the second tone mapping curve may be greater than input luminance.

In an example, for Technology 4 or Technology 5, the first parameter $P1_{curve}$ includes parameters such as $a_{P1}$ and $p_{P1}$. In this case, $a_{P1}$ may be used as Ta, and a corresponding first value Tp is obtained by looking up a table Tpa (Tp, Ta). Herein, the table Tpa (Tp, Ta) is an example of the preset correspondence between $a_{P1}$ and $p_{P1}$. Ta represents a threshold of the curve parameter a in Technology 3, Technology 4, or Technology 5.

If $p_{P1}$ is greater than Tp, the preset condition is met. Optionally, in this case, $p_{P1}$ in the first parameter $P1_{curve}$ may be replaced with the first value Tp obtained through table lookup. In this way, a first parameter $P1_{curve}$ obtained after replacement may be the foregoing second parameter $R_{curve}$.

If $p_{P1}$ is less than or equal to Tp, the process of generating the second parameter $R_{curve}$ of the second tone mapping curve does not need to be performed.

In an embodiment, the preset condition may be that a parameter $a_{P1}$ in the first parameter is greater than a second value Ta. The second value Ta is obtained based on $p_{P1}$ in the first parameter and a preset correspondence between $a_{P1}$ and $p_{P1}$. When the first parameter $a_{P1}$ exceeds Ta, output luminance at a point on the second tone mapping curve may be greater than input luminance.

In an example, for Technology 4 or Technology 5, the first parameter $P1_{curve}$ includes parameters such as $a_{P1}$ and $p_{P1}$. In this case, $p_{P1}$ may be used as Tp, and a corresponding second value Ta is obtained by looking up a table Tpa (Tp, Ta). Herein, the table Tpa (Tp, Ta) is an example of the preset correspondence between $a_{P1}$ and $p_{P1}$.

If $a_{P1}$ is greater than Ta, the preset condition is met. Optionally, in this case, $a_{P1}$ in the first parameter $P1_{curve}$ may be replaced with the second value Ta obtained through table lookup. In this way, the first parameter obtained after replacement may be the second parameter $R_{curve}$.

If $a_{P1}$ is less than or equal to Ta, the process of generating the second parameter $R_{curve}$ of the second tone mapping curve does not need to be performed.

In the foregoing example, Table Tpa (Tp, Ta) is a preset rational number combination, for example, (3.5, 0.879) and (4.5, 0.777). It should be noted that, for a value that does not appear in the table, the value may be generated by using a linear difference, an adjacent value, a weighted average value of adjacent values, or the like. In addition, a specific form of the table Tpa (Tp, Ta) is not limited in this embodiment of this application. For example, the table Tpa (Tp, Ta) may alternatively be represented as a function relationship between Tp and Ta.

In an embodiment, the preset condition is that a product of a parameter $a_{P1}$ and a parameter pP1 in the first parameter is greater than a third value Tap. The third value Tap is a preset rational number. For example, the third value Tap may be a rational number between 3 and 4, for example, 3.2 or 3.4. This is not limited in this embodiment of this application.

In an example, for Technology 4 or Technology 5, the first parameter $P1_{curve}$ includes parameters such as $a_{P1}$ and $p_{P1}$. In this case, whether the product $a_{P1}$*pP1 of the parameter $a_{P1}$ and the parameter $p_{P1}$ is greater than a preset value Tap may be determined.

If $a_{P1}$*$p_{P1}$ is greater than Tap, the preset condition is met. Optionally, in this case, $p_{P1}$ in the first parameter $P1_{curve}$ may be replaced with Tap/$a_{P1}$, or $a_{P1}$ in the first parameter may be replaced with Tap/$p_{P1}$. In this way, the first parameter obtained after replacement may be the second parameter $R_{curve}$.

If $a_{P1}*p_{P1}$ is less than or equal to Tap, the process of generating the second parameter $R_{curve}$ of the second tone mapping curve does not need to be performed.

In an embodiment, the first parameter $P1_{curve}$ corresponding to the first tone mapping curve may alternatively be further converted into an absolute luminance space, for example, a linear space, or a non-linear space such as PQ or HLG. In this case, it needs to be ensured that luminance of y and x with a same value is the same. Then, it may be determined, based on whether the first tone mapping curve has an intersection point with the straight line y=x, that the first tone mapping curve has a part higher than y=x. For example, if the first tone mapping curve has an intersection point with the straight line y=x, it may be determined that the first tone mapping curve has a part higher than y=x. If the first tone mapping curve does not have an intersection point with y=x, it may be determined that the first tone mapping curve does not have a part higher than y=x.

Therefore, in this embodiment of this application, a parameter of the first tone mapping curve is further adjusted, so that output luminance of a point on a tone mapping curve (that is, the second tone mapping curve) corresponding to an adjusted curve parameter (that is, the second parameter) is not greater than corresponding input luminance of the point. This helps avoid, when maximum display luminance of an image is close to maximum display luminance of a display device, an abnormality that luminance of a pixel of a mapped terminal device is greater than that of an original image.

In an embodiment, the second parameter further includes a linear spline curve parameter. The linear spline curve parameter includes a maximum value TH3C (which may also be referred to as first maximum input luminance TH3C) of a luminance value of a range pixel of a linear spline (which may be denoted as a first linear spline) in the second tone mapping curve, and a slope Dark of the first linear spline. For example, the first linear spline is, for example, a tone mapping curve whose input luminance is less than TH3C in the foregoing formula (9), that is, Dark×L, L<TH3C. L<TH3C is range pixel of the first linear spline.

In an embodiment, the display device may obtain a maximum value TH3C0 (which may also be referred to as initial first maximum input luminance TH3C0) of a luminance value of an initial range pixel of the first linear spline and an initial slope Dark0, then determine the first maximum input luminance TH3C based on the initial first maximum input luminance TH3C0, and determine the slope Dark based on the initial slope Dark0.

The following describes three methods for obtaining the initial first maximum input luminance TH3C0 provided in this embodiment of this application.
Method 1

The display device may determine the initial first maximum input luminance TH3C0 based on the first parameter $P1_{curve}$. For example, when the first tone mapping curve has a linear spline (which may be denoted as a second linear spline, for example, Technology 2, Technology 4, or Technology 5), the initial first maximum input luminance TH3C0 may be determined as a maximum value of a luminance value of a range pixel of the second linear spline.
Method 2

The display device determines the initial first maximum input luminance TH3C0 based on a preset value. For example, the preset value may be a boundary of dark vision and bright vision, that is, luminance in which responses of a cone cell and a rod cell of a human eye increase and decrease, for example, 1 nit.

Method 3

The display device determines the initial first maximum input luminance TH3C0 based on the metadata M of the image data V. The metadata M includes feature data of a quantity of dark region pixels in a histogram, for example, a feature luminance location of the quantity of dark region pixels in the histogram or luminance in which a quantity/an accumulated quantity of pixels from dark to bright in the dark region pixels significantly changes, or a percentage of a quantity of pixels accumulated from 0 to feature luminance in total pixels being greater than a preset percentage.

The following describes three methods for obtaining the initial slope Dark0 provided in this embodiment of this application.
Method 1

The display device may determine the initial slope Dark0 based on the first parameter $P1_{curve}$. For example, when the first tone mapping curve has a linear spline (for example, a second linear spline), the initial slope Dark0 may be determined as a slope of the second linear spline, for example, MB0 in Technology 4 or Technology 5.
Method 2

The display device may determine the initial slope Dark0 based on a ratio of a fourth value to the first maximum input luminance TH3C. The fourth value is an output value of the first tone mapping curve at the first maximum input luminance TH3C. For example, the fourth value may be represented as Vdark=$P1_{curve}$ (TH3C). In this case, the initial slope Dark0 may be represented as (V dark/TH3C).
Method 3

The display device may determine the initial slope Dark0 based on a slope value of a preset input value of the first tone mapping curve between 0 and the first maximum input luminance TH3C. For example, the initial slope Dark0 may be an average value, a maximum value, or an intermediate value of slope values between 0 and the first maximum input luminance TH3C. This is not limited in this application.

It should be noted that the foregoing manners of obtaining the initial maximum input luminance TH3C0 or the initial slope Dark0 are merely examples, and do not constitute a limitation on this embodiment of this application. For example, a manner similar to the foregoing methods, or a manner of obtaining the initial maximum input luminance TH3C0 or the initial slope Dark0 by replacing the foregoing methods with a common means also falls within the protection scope of this embodiment of this application.

The following describes two methods for obtaining the first maximum input luminance TH3C and the slope Dark of the second target tone mapping curve based on the initial first maximum input luminance TH3C0 and the initial slope Dark0 provided in this embodiment of this application.
Method 1

The first maximum input luminance TH3C and the slope Dark may be determined based on the following formulas (10) and (11), that is, the first initial maximum input luminance TH3C0, the first maximum input luminance TH3C, the initial slope Dark0, and the slope Dark satisfy the following formulas (10) and (11):

$$TH3C = TH3C0 + (MaxSource - TH3C0)*(WA)^{N2} \quad (10), \text{ and}$$

$$Dark = Dark0 + (1 - Dark0)*(WA)^{N1} \quad (11), \text{ where}$$

$$WA = \frac{\frac{MaxDisplay}{MaxSource} - \frac{MaxDisplay}{G(MaxDisplay)}}{1 - \frac{MaxDisplay}{G(MaxDisplay)}}, \text{ or}$$

-continued $$WA = \frac{\frac{MaxDisplay}{MaxSource} - \frac{H(MaxSource)}{MaxSource}}{1 - \frac{H(MaxSource)}{MaxSource}}.$$

N1 and N2 are rational numbers greater than 0, H(L) is a tone mapping curve, and G(L) is an inverse function of H(L).

Method 2

The first maximum input luminance TH3C and the slope Dark may be determined based on the following formulas (12) and (13), that is, the first initial maximum input luminance TH3C0, the first maximum input luminance TH3C, the initial slope Dark0, and the slope Dark satisfy the following formulas (12) and (13):

$$TH3C = TH3C0 + (\text{MaxLum} - TH3C0)*(WA)^{N2} \quad (12), \text{ and}$$

$$\text{Dark} = \text{Dark}0 + (1 - \text{Dark}0)*(WA)^{N1} \quad (13), \text{ where}$$

$$WA = \frac{\frac{MaxDisplay}{\max\_lum} - \frac{MaxDisplay}{G(MaxDisplay)}}{1 - \frac{MaxDisplay}{G(MaxDisplay)}}, \text{ or}$$

$$WA = \frac{\frac{MaxDisplay}{\text{Max\_lum}} - \frac{H(\text{Max\_lum})}{\text{Max\_lum}}}{1 - \frac{H(\text{Max\_lum})}{\text{Max\_lum}}}.$$

MaxLum is an adjustment value of the maximum luminance MaxSource of the image data, H(L) is a tone mapping curve function, and G(L) is an inverse function of H(L). It should be noted that a manner of adjusting from MaxSource to MaxLum is not limited in this embodiment of this application.

For example, for the tone mapping curve in the following formula (14-1), an inverse function G(L) of the tone mapping curve is shown in a formula (15-1):

$$L' = F(L) = a \times \left(\frac{p \times L^n}{(k_1 \times p - k_2) \times L^n + k_3}\right)^m + b, \text{ and} \quad (14\text{-}1)$$

$$G(L) = \left(\frac{K3 \times \left(\frac{L-b}{a}\right)^{\frac{1}{m}}}{p - (K1 \times p - K2) \times \left(\frac{L-b}{a}\right)^{\frac{1}{m}}}\right)^{\frac{1}{n}}. \quad (15\text{-}1)$$

For example, for the tone mapping curve in the following formula (14-2), an inverse function G(L) of the tone mapping curve is shown in a formula (15-2):

$$L' = F(L) = a \times \left(\frac{p \times L^n}{(k_1 \times p - k_2) \times L^n + k_3}\right)^m + b, \text{ and} \quad (14\text{-}2)$$

$$G(L) = \left(\frac{K3 \times \left(\frac{L}{a}\right)^{\frac{1}{m}}}{p - (K1 \times p - K2) \times \left(\frac{L}{a}\right)^{\frac{1}{m}}}\right)^{\frac{1}{n}}. \quad (15\text{-}2)$$

In an embodiment of this application, when dynamic range mapping is performed on the image data based on the second parameter, a straight line part may be used to perform tone mapping in a dark region of the image data. In this way, a luminance gain can be controlled. In addition, it is more convenient to control the second parameter to gradually change from a straight line to a straight line y=x. The straight line y=x is equivalent to that output luminance at any point on a tone mapping curve is equal to input luminance. Therefore, in this embodiment of this application, a flicker phenomenon is not likely to be caused for the content with gradient luminance.

In an embodiment, the second tone mapping curve further includes a cubic spline curve. The second parameter $R_{curve}$ further includes a minimum value of a luminance value of a first range pixel of a first cubic spline of the second tone mapping curve. In this case, the display device may determine, based on the maximum value TH3C of a luminance value of the range pixel of the linear spline on the second tone mapping curve, that is, the first maximum input luminance TH3C, a maximum value TH1D of a luminance value of a first range pixel of the first cubic spline. For example, the maximum value TH1D of the luminance value of the first range pixel may be equal to the first maximum input luminance TH3C, that is, TH1D=TH3C.

For example, a tone mapping curve corresponding to the first cubic spline may be a tone mapping curve whose input luminance range is greater than or equal to TH3C and less than TH2D in the foregoing formula (9), that is, MD1D×(L−TH1D)$^3$+MC1D×(L−TH1D)$^2$+MB1D×(L−TH1D)+MA1D, TH1D≤L<TH2D, where TH1D≤L<TH2D is the first range pixel.

The second parameter $R_{curve}$ further includes a maximum value TH2D of a luminance value of the first range pixel of the first cubic spline, and the maximum value TH2D may also be referred to as the second maximum input luminance TH2D. For example, the second maximum input luminance TH2D may be determined based on the foregoing maximum value TH1D of the luminance value of the first range pixel.

In an embodiment, the second parameter $R_{curve}$ further includes a maximum value TH3D of a luminance value of a second range pixel of a second cubic spline on the second tone mapping curve, and the maximum value TH3D may also be referred to as a third maximum input luminance TH3D. Optionally, the minimum value of the luminance value of the second range pixel may be TH2D. For example, a tone mapping curve corresponding to the second cubic spline may be a tone mapping curve whose input luminance range is greater than or equal to TH2D and less than TH3D in the foregoing formula (9), that is, MD2D×(L−TH2D)$^3$+MC2D×(L−TH2D)$^2$+MB2D×(L−TH2D)+MA2D, TH2D≤L<TH3D, where TH2D≤L≤TH3D is the second range pixel.

For example, the display device may determine the third maximum input luminance TH3D based on the maximum value TH1D of the luminance value of the first range pixel and the second maximum input luminance TH2D.

The following describes three methods for determining the second maximum input luminance TH2D and the third maximum input luminance TH3D provided in this embodiment of this application.

Method 1

The display device may determine the second maximum input luminance TH2D based on the maximum value TH1D of the luminance value of the first range pixel and TH1[0], TH2[0], and TH3[0] in the first parameter (or parameters TH1[0], TH2[0], and TH3[0] included in the metadata M).

For example, TH2D and TH3D may respectively satisfy the following formula (16-1) and formula (17-1):

$$TH2D=TH1D+TH2[0]-TH1[0] \quad (16\text{-}1), \text{ and}$$

$$TH3D=TH2D+TH3[0]-TH2[0] \quad (17\text{-}1).$$

Method 2

The display device may determine the second maximum input luminance TH2D based on the maximum value TH1D of the luminance value of the first range pixel and deltaTH2[0] and deltaTH3[0] in the first parameter (or parameters deltaTH2[0] and deltaTH3[0] included in the metadata M). For example, TH2D and TH3D may respectively satisfy the following formula (16-2) and formula (17-2):

$$TH2D=TH1D+\text{deltaTH2}[0] \quad (16\text{-}2), \text{ and}$$

$$TH3D=TH2D+\text{deltaTH3}[0] \quad (17\text{-}2).$$

Method 3

The display device may determine TH2D and TH3D based on TH1D and the preset value. For example, TH2D and TH3D may respectively satisfy the following formula (18) and formula (19):

$$TH2D=TH1D+B \quad (18), \text{ and}$$

$$TH3D=TH2D+C*TH2D-D*TH1D \quad (19).$$

B is a rational number greater than 0, for example, may be an offset value corresponding to a luminance value of a dark-bright transition region pixel, and a default value of B may be 0.15. C and D are rational numbers greater than 0, for example, are weighting coefficients corresponding to a luminance value of a bright-region pixel, and default values of C and D may be 0.5.

Optionally, parameters such as MD1D, MC1D, MB1D, MA1D, MD2D, MC2D, MB2D and MA2D in the second parameter $R_{curve}$ (that is, in the formula (9)) may be determined. For example, these parameters may be determined based on the following formulas (14) to (19).

In some embodiments, the minimum value TH1D of the luminance value of the first range pixel of the first cubic spline on the second tone mapping curve is the same as the first maximum input luminance TH3C (that is, the maximum value TH3C of the luminance value of the range pixel of the first linear spline). In this way, the range pixel of the linear spline on the second tone mapping curve can be consecutive with first range pixel of the first cubic spline. In addition, output values of the first linear spline and the first cubic spline on the second tone mapping curve at TH1D are the same, and first-order derivatives of the first linear spline and the first cubic spline on the second tone mapping curve at TH1D are the same, that is, the second tone mapping curve is consecutive at TH1D.

For example, for the $R_{curve}$ parameter in the formula (9), when the second tone mapping curve is consecutive at TH1D, MA1D, Dark, TH3C, and MB1D satisfy the following formulas (20) and (21):

$$\text{Dark} \times TH3C = MA1D \quad (20), \text{ and}$$

$$\text{Dark} = MB1D \quad (21).$$

In some embodiments, the maximum value of the luminance value of the second range pixel of the second cubic spline is the same as the maximum value TH2D of the luminance value of the first range pixel of the first cubic spline, that is, the second maximum input luminance TH2D. Output values of the second cubic spline and the first cubic spline at TH2D are the same. In this way, the first range pixel of the first cubic spline on the second tone mapping curve can be consecutive with the second range pixel of the second cubic spline. In addition, first-order derivatives of the second cubic spline and the first cubic spline at TH2D are the same, that is, the second tone mapping curve is consecutive at TH2D.

For example, for the $R_{curve}$ parameter in the formula (9), when the second tone mapping curve is consecutive at TH2D, MD1D, TH3C, MC1D, MB1D, MA1D, MD2D, TH2D, MB2D, and MA2D satisfy the following formulas (22) and (23):

$$MD1D \times (TH2D-TH3C) + MC1D \times (TH2D-TH3C)^2 + MB1D \times (TH2D-TH3C) + MA1D = MA2D \quad (22), \text{ and}$$

$$3 \times MD1D \times (TH2D-TH3C)^3 + 2 \times MC1D \times (TH2D-TH3C) + MB1D = MB2D \quad (23).$$

In some embodiments, the second parameter further includes a curve parameter of a tone mapping subfunction of the second tone mapping curve. A minimum value of a luminance value of a third range pixel of the tone mapping subfunction is the same as the maximum value TH3D of the luminance value of the second range pixel of the second cubic spline, that is, the third maximum input luminance TH3D. In this way, the second range pixel of the second cubic spline on the second tone mapping curve can be consecutive with second range pixel corresponding to the tone mapping subfunction. Moreover, output values of the second cubic spline and the tone mapping subfunction at TH3D are the same, and first derivatives of the second cubic spline and the tone mapping subfunction at TH3D are the same, that is, the second tone mapping curve is consecutive at TH3D.

For example, for the $R_{curve}$ parameter in the formula (9), when the second tone mapping curve is consecutive at TH3D, MD2D, TH3D, TH2D, MC2D, MB2D, MA2D, MD2D, MC2D, and MB2D satisfy the following formulas (24) and (25):

$$MD2D \times (TH3D - TH2D)^3 + MC2D \times (TH3D - TH2D)^2 + MB2D \times (TH3D - TH2D) + MA2D = P_{curve}(TH3D), \text{ and} \quad (24)$$

$$3 \times MD2D \times (TH3D - TH2D)^2 + 2 \times MC2D \times (TH3D - TH2D) + MB2D = \frac{d(P_{curve}(TH3D))}{dL}. \quad (25)$$

In addition, in some embodiments, values of the foregoing two segments of cubic splines (that is, the first cubic spline and the second cubic spline) at TH2D may be obtained according to a preset policy. For example, values of the two segments of cubic splines at TH2D each may be a value of a middle point of a connection line between two points whose input luminance is TH1D and TH3D and that are on the second tone mapping curve.

In this embodiment of this application, on one hand, the cubic spline curve in the second tone mapping curve can smoothly connect a linear spline curve to a basic curve, and on the other hand, the cubic spline curve can help control a gain of a part adjacent to the straight line part.

It should be noted that, in this embodiment of this application, only a process of obtaining a linear spline parameter in the second parameter may be included, and a process of obtaining a parameter other than the linear spline parameter in the second parameter does not need to be involved.

In operation 940, dynamic range mapping on the image data is performed based on the second parameter of the second tone mapping curve. For example, after the second parameter is obtained, the second tone mapping curve may be obtained to perform dynamic range mapping on the image data.

For example, a mapping relationship between normalized HDR/SDR source data and normalized HDR/SDR display data may be obtained based on the foregoing formula (9). For example, based on a maximum display capability and a minimum display capability (for example, 0) of the display device, a mapping value L' may be reversely normalized to a value between the maximum display capability and the minimum display capability of the display device. It should be noted that the foregoing reverse normalization calculation may be a non-linear space of PQ, or may be a linear space of normalization 0 to 1. In addition, reverse normalization may be 0-10000 nits, or may be 0.0001-100000 nits, or the like. A reverse normalization range and a reverse normalization process of HDR/SDR mapping data L' are not limited in this embodiment of this application.

It should be noted that after the second tone mapping curve is obtained, subsequent display adaptation processing not only includes tone mapping (tone mapping), but also may be further adjusted before display to adjust saturation processing, color gamut transformation processing, denoising processing, sharpening processing, and/or the like. This is not limited in this embodiment of this application.

It should be further noted that the maximum display capability of the display device may be obtained based on a parameter of the device or information about a manufacturer. The minimum display capability of the display device is usually 0 nits, or may be 1 nit. This is not limited in this embodiment of this application.

Therefore, in this embodiment of this application, a parameter of a tone mapping curve is further adjusted, so that output luminance of a tone mapping curve corresponding to an adjusted curve parameter is not greater than input luminance of the tone mapping curve. This helps avoid, when maximum display luminance of an image is close to maximum display luminance of a display device, an abnormality that luminance of a pixel of a mapped display device is greater than that of an original image. Therefore, in this embodiment of this application, high flexibility can be provided for terminal display devices with different luminance, to achieve good presentation effect when a parameter is properly adjusted.

In some embodiments of this application, the linear spline curve parameter (which may be denoted as a first linear spline curve parameter) in the second parameter may include the slope of the first linear spline on the second tone mapping curve (for example, may be represented as MB[0][0]) and the maximum value (for example, may be represented as TH3[0]) of the luminance value of the range pixel of the first linear spline).

In some embodiments of this application, the linear spline curve parameter (which may be denoted as a first linear spline curve parameter) in the second parameter may include the slope of the first linear spline on the second tone mapping curve (for example, may be represented as MB[0][0]), the maximum value (for example, may be represented as TH3[0]) of the luminance value of the range pixel of the first linear spline), and an intersection point base_offset of the first linear spline and a vertical axis.

In this embodiment, the linear spline curve parameter (which may be denoted as a second linear spline curve parameter) included in the first parameter may include a slope (for example, may be represented as MB_mid[0][0]) of the second linear spline on the first tone mapping curve and/or the maximum value (for example, may be represented as TH3_mid[0]) of the luminance value of the range pixel of the second linear spline.

In this case, an implementation of obtaining, based on the first parameter, the display parameter, and the feature information, the second parameter of the second tone mapping curve when the preset condition is met may be: adjusting the curve parameters MB_mid[0][0] and TH3_mid[0] based on the maximum display luminance MaxDisplay and the maximum luminance correction value max_lum, to obtain the curve parameters MB[0][0] and TH3[0].

For example, if a parameter m_a (that is, a tone mapping curve parameter a) is greater than Tm_ap(m_p), a process of generating the second parameter is performed, that is, MB[0][0] and TH3[0] are adjusted based on max_lum/MaxDisplay. Tm_ap may be obtained based on a preset mapping relationship between m_p_T and m_a_T, for example, by looking up a table (m_p_T, m_a_T), where m_p corresponds to a tone mapping curve parameter p, and a preset value Tm_ap(m_p) of m_a obtained based on m_p is m_a_T.

For example, when the curve parameters MB_mid[0][0] and TH3_mid[0] are adjusted, input may be maximum display luminance MaxDisplay (a value of a PQ domain) in a display luminance range of the display device, a maximum luminance correction value max_lum of a to-be-processed frame, targeted_system_display_maximum_luminance in metadata (if targeted_system_display_maximum_luminance does not exist in the metadata, the targeted_system_display_maximum_luminance is equal to MaxDisplay), an original linear spline curve (that is, a linear spline curve in the first tone mapping curve) parameter MB[0][0] or TH3[0], and a color signal mapping curve parameter Ptone_mapping, including m_p, m_m, m_n, m_a, m_b, k1, k2, and k3. Output may be a linear spline curve (that is, a linear spline on the second tone mapping curve) parameter MB[0][0], or TH3[0].

In an embodiment, the curve parameters MB_mid[0][0] and TH3_mid[0], and the curve parameters MB[0][0] and TH3[0] satisfy the following formulas (26) and (27):

$$TH3[0]=TH3\_mid[0]+(\text{MaxSource}-TH3\_mid[0])*(WA)^{N2} \quad (26), \text{and}$$

$$MB[0][0]=MB\_mid[0][0]+(1-MB\_mid[0][0])*(WA)^{N1} \quad (27), \text{where}$$

$$WA = \frac{\frac{MaxDisplay}{MaxSource} - \frac{MaxDisplay}{G(MaxDisplay)}}{1 - \frac{MaxDisplay}{G(MaxDisplay)}}, \text{or}$$

-continued $$WA = \frac{\frac{MaxDisplay}{Max\_lum} - \frac{H(Max\_lum)}{Max\_lum}}{1 - \frac{H(Max\_lum)}{Max\_lum}}.$$

N1 and N2 are rational numbers greater than 0, and G(L) is an inverse function of a mapping curve parameter $T_{curve}$.

In an embodiment, the curve parameters MB_mid[0][0] and TH3_mid[0], and the curve parameters MB[0][0] and TH3[0] satisfy the following formulas (28) and (29):

$$TH3[0] = TH3\_mid[0] + (MaxLum - TH3\_mid[0]) * (WA) \underset{N2}{} \quad (28), \text{ and}$$

$$MB[0][0] = MB\_mid[0][0] + (1 - MB\_mid[0][0]) * (WA)^{N1} \quad (29), \text{ where}$$

$$WA = \frac{\frac{MaxDisplay}{max\_lum} - \frac{MaxDisplay}{G(MaxDisplay)}}{1 - \frac{MaxDisplay}{G(MaxDisplay)}}, \text{ or}$$

$$WA = \frac{\frac{MaxDisplay}{Max\_lum} - \frac{H(Max\_lum)}{Max\_lum}}{1 - \frac{H(Max\_lum)}{Max\_lum}}.$$

MaxLum is the maximum luminance correction value (an adjustment value of MaxSource), and G (L) is an inverse function of a mapping curve parameter $T_{curve}$.

In another possible implementation, the curve parameters MB_mid[0][0] and TH3_mid[0], and the curve parameters MB[0][0] and TH3[0] satisfy the following formulas (30) and (31):

$$MB[0][0] = \min(\max(MB\_mid[0][0] + (1 - MB\_mid[0][0]) * (WA)^{N1}, MB\_mid[0][0]), 1) \quad (30), \text{ and}$$

$$TH3[0] = \min(\max(TH3\_mid[0] + (\max\_lum - TH3\_mid[0]) * (WA)^{N2}, TH3\_mid[0]), 1) \quad (31), \text{ where}$$

$$WA = \frac{\frac{MaxDisplay}{max\_lum} - \frac{MaxDisplay}{G(MaxDisplay, m\_a\_T)}}{1 - \frac{MaxDisplay}{G(MaxDisplay, m\_a\_T)}}, \text{ or}$$

$$WA = \frac{\frac{MaxDisplay}{Max\_lum} - \frac{H(Max\_lum, m\_a\_T)}{Max\_lum}}{1 - \frac{H(Max\_lum, m\_a\_T)}{Max\_lum}}, \text{ where}$$

$$G(L, m\_a) = \left(\frac{K3 \times \left(\frac{L - m\_b}{m\_a}\right)^{\frac{1}{m\_m}}}{m\_p - (K1 \times m\_p - K2) \times \left(\frac{L - m\_b}{m\_a}\right)^{\frac{1}{m\_m}}}\right)^{\frac{1}{m\_n}}, \text{ or}$$

$$G(L, m\_a) = \left(\frac{K3 \times \left(\frac{L}{m\_a}\right)^{\frac{1}{m\_m}}}{m\_p - (K1 \times m\_p - K2) \times \left(\frac{L}{m\_a}\right)^{\frac{1}{m\_m}}}\right)^{\frac{1}{m\_n}}.$$

L is an input signal, G(L) is an inverse function of a function H(L) corresponding to a tone mapping curve, m_a, m_b, m_m, m_n, k1, k2, and k3 are curve parameters, G(L, m_a_T) indicates a G(L) value corresponding to an input variable L when a value of a parameter M_a of G(L) is m_a_T, and H(L, m_a_T) is similar. N1 and N2 are rational numbers, for example, default values of N1 and N2 may be 0. max(a, b) indicates calculating a larger value of a and b, and min(a, b) indicates calculating a smaller value of a and b.

In some embodiments, k1 and k2 are not 0 at the same time, and K3 is not 0.

For example, H(L) is the following several examples:

$$H(L) = m\_a \times \left(\frac{m\_p \times L^{m\_n}}{(K1 \times m\_p - K2) \times L^{m\_n} + K3}\right)^{m\_m} + m\_b, \text{ or}$$

$$H(L) = m\_a \times \left(\frac{m\_p \times L^{m\_n}}{(K1 \times m\_p - K2) \times L^{m\_n} + K3}\right)^{m\_m}.$$

In some embodiments of this application, the first parameter may include the second linear spline curve parameter. The second linear spline curve parameter includes the slope MB_mid[0][0] of the second linear spline on the first tone mapping curve and/or the maximum value TH3_mid[0] of the luminance value of the range pixel of the second linear spline and/or an intersection point base_offset_mid of the first linear spline and a vertical coordinate axis. The display parameter includes the maximum display luminance MaxDisplay of the terminal device. The feature information includes the maximum luminance correction value max_lum of the image data.

That the second parameter of the second tone mapping curve is obtained based on the first parameter, the display parameter, and the feature information includes: adjusting the curve parameters MB_mid[0][0], TH3_mid[0], and/or base_offset_mid based on the maximum display luminance MaxDisplay and the maximum luminance correction value max_lum, to obtain the curve parameters MB[0][0], TH3[0], and/or base_offset.

In an embodiment, the curve parameters MB_mid[0][0], TH3_mid[0], and/or base_offset_mid, and the curve parameters MB[0][0], TH3[0], and/or base_offset satisfy the following formulas:

$$MB[0][0] = \min(\max(MB\_mid[0][0] + (1 - MB\_mid[0][0]) * (WA)^{N1}, MB\_mid[0][0]), 1),$$

$$TH3[0] = \min(\max(TH3\_mid[0] + (\max\_lum - TH3\_mid[0]) * (WA)^{N2}, TH3\_mid[0]), 1),$$

and $$base\_offset = \min(\max(base\_offset\_mid * (1 - (WA)^{N3}), 0), base\_offset\_mid), \text{ where}$$

$$WA = \frac{\frac{MaxDisplay}{max\_lum} - \frac{MaxDisplay}{G(MaxDisplay, m\_a\_T)}}{1 - \frac{MaxDisplay}{G(MaxDisplay, m\_a\_T)}},$$

$$G(L, m\_a) = \left(\frac{K3 \times \left(\frac{L - m\_b}{m\_a}\right)^{\frac{1}{m\_m}}}{m\_p - (K1 \times m\_p - K2) \times \left(\frac{L - m\_b}{m\_a}\right)^{\frac{1}{m\_m}}}\right)^{\frac{1}{m\_n}}, \text{ or}$$

-continued $$G(L, \text{m\_a}) = \left( \frac{K3 \times \left(\frac{L}{\text{m\_a}}\right)^{\frac{1}{m\_m}}}{\text{m\_p} - (K1 \times \text{m\_p} - K2 \times \left(\frac{L}{\text{m\_a}}\right)^{\frac{1}{m\_m}})} \right)^{\frac{1}{m\_n}}.$$

L is an input signal, G(L) is an inverse function of a function H(L) corresponding to a tone mapping curve, m_a, m_b, m_m, m_n, k1, k2, and k3 are curve parameters, G(L, m_a_T) indicates a G(L) value corresponding to an input variable L when a value of a parameter M_a of G(L) is m_a_T, N1, N2, and N3 are rational numbers, max(a, b) indicates calculating a larger value of a and b, min(a, b) indicates calculating a smaller value of a and b, and H(L) is $$H(L) = \text{m\_a} \times \left( \frac{\text{m\_p} \times L^{m\_n}}{(K1 \times \text{m\_p} - K2) \times L^{m\_n} + K3} \right)^{m\_m} + \text{m\_b, or}$$

$$H(L) = \text{m\_a} \times \left( \frac{\text{m\_p} \times L^{m\_n}}{(K1 \times \text{m\_p} - K2) \times L^{m\_n} + K3} \right)^{m\_m}.$$

It should be noted that, in this embodiment of this application, only the process of obtaining the linear spline parameter in the second parameter may be included, and the process of obtaining the parameter other than the linear spline parameter in the second parameter does not need to be involved. In other words, the following processing process may not need to be involved.

In some embodiments, the second parameter includes a cubic spline curve parameter. The cubic spline curve parameter includes interpolation point values TH1[1], TH2[1], and TH3[1] of a cubic spline on the second tone mapping curve. TH1[1] indicates a minimum value of a luminance value of first range pixel of the cubic spline. TH2[1] indicates a maximum value of the luminance value of the first range pixel of the cubic spline and a minimum value of a luminance value of second range pixel of the cubic spline. TH3[1] indicates a maximum value of the luminance value of the second range pixel of the cubic spline. For example, TH1[1] may be an example of TH1D, TH2[1] may be an example of TH2D, and TH3[1] may be an example of TH3D.

In an embodiment, the interpolation point values TH1[1], TH2[1], and TH3[1] of the cubic spline may be calculated based on the second linear spline curve parameter TH3[0] in the first parameter and preset offset values of correlation values for calculating the interpolation point values TH1[1], TH2[1], and TH3[1] of the cubic spline. For example, TH1[1], TH2[1], and TH3[1] satisfy the following formulas (32) to (34):

$$TH1[1]=TH3[0] \tag{32},$$

$$TH2[1]=TH1[1]+B \tag{33}, \text{ and}$$

$$TH3[1]=TH2[1]+C*TH2[1]-D*TH1[1] \tag{34}.$$

B, C, and D are preset values of the correlation values for calculating the interpolation point values TH1[1], TH2[1], and TH3[1] of the cubic spline. B is a preset offset value corresponding to a luminance value of a dark-bright transition region pixel. C and D are preset weighting coefficients corresponding to a luminance value of a bright region pixel. For example, a default value of B may be 0.15, and default values of C and D may be 0.5.

In an embodiment, the interpolation point values TH1[1], TH2[1], and TH3[1] of the cubic spline may be calculated based on the second linear spline curve parameter TH3[0] in the first parameter and correlation values for calculating the interpolation point values TH1[1], TH2[1], and TH3[1] of the cubic spline. For example, TH1[1], TH2[1], and TH3[1] satisfy the following formulas (35) to (37):

$$TH1[1]=3\text{Spline\_}TH[i][0][w] \tag{35},$$

$$TH2[1]=3\text{Spline\_}TH[i][0][w]+3\text{Spline\_}TH\_\text{Delta1}[i][1][w] \tag{36}, \text{ and}$$

$$TH3[1]=3\text{Spline\_}TH[i][0][w]+3\text{Spline\_}TH\_\text{Delta1}[i][1][w]+3\text{Spline\_}TH\_\text{Delta1}[i][2][w] \tag{37}.$$

3Spline_TH[i][0][w], 3Spline_TH_Delta1[i][1][w], and 3Spline_TH_Delta1[i][2][w] are the correlation values that are used for calculating the interpolation point values TH1[1], TH2[1], and TH3[1] of the cubic spline and that are extracted from the metadata.

In some embodiments, coordinates (for example, Y coordinates) corresponding to TH1[1], TH2[1], and TH3[1] in the second tone mapping curve may be obtained, for example, may be respectively represented as VA1, VA2, and VA3. A Y coordinate of the linear spline on the second tone mapping curve at TH3[0] is the same as a Y coordinate of the cubic spline on the second tone mapping curve at TH1[1], and a first-order derivative of the linear spline at TH3[0] is the same as a first-order derivative of the cubic spline at TH1[1].

In some embodiments, a Y coordinate of the first cubic spline on the second tone mapping curve at TH2[1] is the same as a Y coordinate of the second cubic spline on the second tone mapping curve at TH2[1], and a first-order derivative of the first cubic spline at TH2[1] is the same as a first-order derivative of the second cubic spline at TH2[1].

In some embodiments, a Y coordinate of the second cubic spline on the second tone mapping curve at TH3[1] is the same as a Y coordinate of a third tone mapping function on the second tone mapping curve at TH3[1], and a first-order derivative of the second cubic spline at TH3[1] is the same as a first-order derivative of the third tone mapping function at TH3[1].

For example, a formula (38) may be obtained based on the linear spline on the second tone mapping curve:

$$F(L)=MB[0][0]\times L \tag{38}.$$

Then, L is set to TH[1], a coordinate VA1 of TH[1] is calculated, and the coordinate VA1 satisfies the following formula (39):

$$VA1=MB[0][0]\times TH[1] \tag{39}.$$

Next, MA[0][1] and MA[1][1] are obtained based on the first cubic spline on the second tone mapping curve, and MA[0][1] and MA[1][1] satisfy the following formulas (40) and (41):

$$MA[0][1]=VA1 \tag{40}, \text{ and}$$

$$MA[1][1]=VA2 \tag{41}.$$

Then, a first-order derivative GD1 of the first cubic spline on the second tone mapping curve is calculated, so that MB[0][1]=GD1, and a first-order derivative GD3 of the second cubic spline on the second tone mapping curve at TH3[1] is calculated. GD1 and GD3 satisfy the following formulas (42) and (43):

$$MB[0][1]=GD1=MB[0][0] \qquad (42), \text{ and}$$

$$GD3=m\_a \times m\_m \times m\_p \times K3 \times m\_n \times TH3[1]^{m\_m-1} \times DGD3(L) \qquad (43), \text{ where}$$

$$DGD3(L) = \left(\frac{m_p \times TH3[1]^{m_n}}{(K1 \times m_p - K2) \times TH3[1]^{m_n} + K3}\right)^{m_m+1} \times \left(\frac{1}{TH3[1]^{m\_n} \times m\_p}\right)^2.$$

Then, a value VA2[0] of a $1^{st}$ cubic spline (that is, the first cubic spline) curve in the second tone mapping curve at TH2[1] is calculated, and a value VA3[0] of a $2^{nd}$ cubic spline (that is, the second cubic spline) curve at TH3[1] is calculated, so that VA3[0]=VA3.

A derivative GD3[0] of the $2^{nd}$ cubic spline curve at TH3[1] is calculated, so that GD3[0]=GD3.

First-order derivatives GD2[0] and GD2[1] of the $P^t$ cubic spline curve and the $2^{nd}$ cubic spline curve at TH2[1] are respectively calculated, so that GD2[0]=GD2[1].

Second-order derivatives GGD2[0] and GGD2[1] of the two cubic spline curves at TH2[1] are calculated, so that GGD2[0]=GGD2[1].

In conclusion, the following formula (44) may be obtained:

$$\begin{cases} MD[0][1] \times (DTH2)^3 + MC[0][1] \times (DTH2)^2 + MB[0][1] \times (DTH2)^1 + MA[0][1] = VA2 \\ MD[1][1] \times (DTH3)^3 + MC[1][1] \times (DTH3)^2 + MB[1][1] \times (DTH3)^1 + MA[1][1] = VA3 \\ 3 \times MD[1][1] \times (DTH3)^2 + 2 \times MC[1][1] \times (DTH3)^1 + MB[1][1] = GD3 \\ 3 \times MD[0][1] \times (DTH2)^2 + 2 \times MC[0][1] \times (DTH2)^1 + MB[0][1] = GD2[0] \\ 3 \times MD[1][1] \times (DTH3)^2 + 2 \times MC[1][1] \times (DTH3)^1 + MB[1][1] = GD2[1] \\ 6 \times MD[0][1] \times (DTH2)^1 + 2 \times MC[0][1] = GGD2[0] \\ 6 \times MD[1][1] \times (DTH3)^1 + 2 \times MC[1][1] = GGD2[1] \end{cases} \qquad (44)$$

, where $DTH2 = (TH2[1] - TH1[1])$, and $DTH3 = (TH3[1] - TH2[1])$.

Parameters such as MC[0][1], MD[0][1], MB[1][1], MC[1][1], and MD[1][1] in the second parameter may be obtained through the foregoing calculation with reference to another condition.

Therefore, in this embodiment of this application, a parameter of the first tone mapping curve is further adjusted, so that output luminance of a point on a tone mapping curve (that is, the second tone mapping curve) corresponding to an adjusted curve parameter (that is, the second parameter) is not greater than corresponding input luminance of the point. This helps avoid, when maximum display luminance of an image is close to maximum display luminance of a display device, an abnormality that luminance of a pixel of a mapped terminal device is greater than that of an original image.

The foregoing describes in detail the dynamic range mapping method in embodiments of this application with reference to FIG. 9. The following describes dynamic range mapping apparatuses in embodiments of this application with reference to FIG. 10 and FIG. 11. It should be understood that the dynamic range mapping apparatuses described in FIG. 10 and FIG. 11 can perform the operations of the dynamic range mapping method shown in FIG. 9. The foregoing limitations on the operations in FIG. 9 are also applicable to the apparatuses shown in FIG. 10 and FIG. 11.

Figure 10:
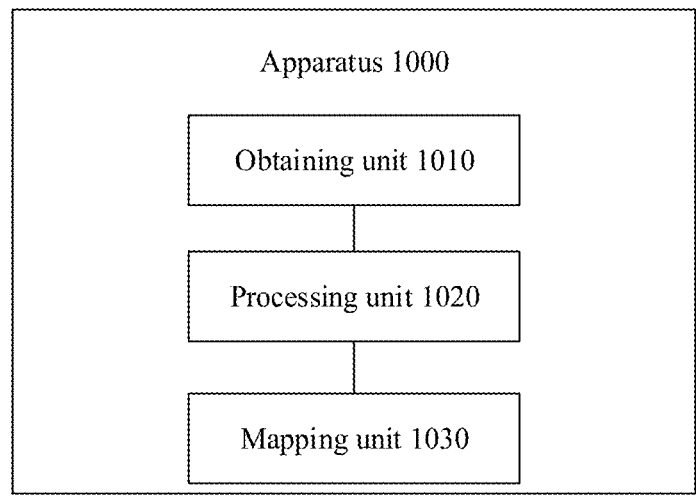
FIG. 10 is a schematic block diagram of a dynamic range mapping apparatus according to an embodiment of this application.
Figure 11:
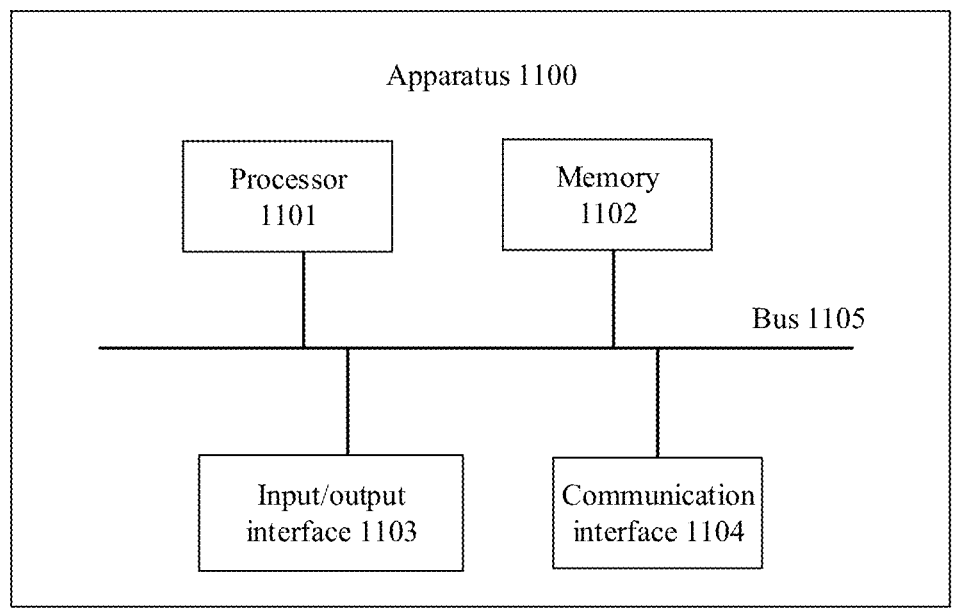
FIG. 11 is a schematic block diagram of another dynamic range mapping apparatus according to an embodiment of this application.

Therefore, when the apparatuses shown in FIG. 10 and FIG. 11 are described below, for brevity, repeated descriptions are appropriately omitted.

FIG. 10 is a schematic block diagram of a dynamic range mapping apparatus 1000 according to an embodiment of this application. The apparatus 1000 includes an obtaining unit 1010, a processing unit 1020, and a mapping unit 1030.

The obtaining unit 1010 is configured to obtain a display parameter of a terminal device.

The obtaining unit 1010 is further configured to obtain feature information of image data.

The obtaining unit 1010 is further configured to obtain a first parameter of a first tone mapping curve of the image data.

The processing unit 1020 is configured to: when a preset condition is met, obtain a second parameter of a second tone mapping curve based on the first parameter, the display parameter of the terminal device, and the feature information of the image data. Output luminance at a first point on the second tone mapping curve is not greater than input luminance at the first point on the second tone mapping curve.

The mapping unit 1030 is configured to perform dynamic range mapping on the image data based on the second parameter of the second tone mapping curve.

In some embodiments of this application, the preset condition is met when any one of the following conditions is met:

When tone mapping is performed on the image data based on the first parameter, output luminance at a second point on the first tone mapping curve is greater than input luminance at the second point on the first tone mapping curve.

Alternatively, a parameter $p_{P1}$ in the first parameter is greater than a first value Tp. The first value Tp is obtained based on $a_{P1}$ in the first parameter and a preset correspondence between $a_{P1}$ and $p_{P1}$.

Alternatively, a parameter $a_{P1}$ in the first parameter is greater than a second value Ta. The second value Ta is obtained based on $p_{P1}$ in the first parameter and a preset correspondence between $a_{P1}$ and $p_{P1}$.

Alternatively, a product of a parameter am and a parameter $p_{P1}$ in the first parameter is greater than a third value Tap. The third value Tap is a preset rational number.

In some implementations of this application, the second parameter includes a first linear spline curve parameter. The first linear spline curve parameter includes a slope MB[0][0] of a first linear spline on the second tone mapping curve or a maximum value TH3[0] of a luminance value of a range pixel of the first linear spline.

In some embodiments of this application, the first parameter includes a second linear spline curve parameter. The second linear spline curve parameter includes a slope MB_mid[0][0] of a second linear spline on the first tone mapping curve and a maximum value TH3_mid[0] of a luminance value of a range pixel of the second linear spline.

The display parameter includes maximum display luminance MaxDisplay of the terminal device. The feature information includes a maximum luminance correction value max_lum of the image data.

The processing unit 1020 is configured to:

adjust the curve parameters MB_mid[0][0] and TH3_mid[0] based on the maximum display luminance MaxDisplay and the maximum luminance correction value max_lum to obtain the curve parameters MB[0][0] and TH3[0].

In some embodiments of this application, the curve parameters MB_mid[0][0] and TH3_mid[0], and the curve parameters MB[0][0] and TH3[0] satisfy the following formulas:

$$MB[0][0]=\min(\max(MB\_mid[0][0]+(1-MB\_mid[0][0])*(WA)^{N1}, MB\_mid[0][0]),1), \text{ and}$$

$$TH3[0]=\min(\max(TH3\_mid[0]+(max\_lum-TH3\_mid[0])*(WA)^{N2}, TH3\_mid[0]),1), \text{ where}$$

$$WA = \frac{\dfrac{MaxDisplay}{max\_lum} - \dfrac{MaxDisplay}{G(MaxDisplay, m\_a\_T)}}{1 - \dfrac{MaxDisplay}{G(MaxDisplay, m\_a\_T)}}, \text{ or}$$

$$WA = \frac{\dfrac{MaxDisplay}{Max\_lum} - \dfrac{H(Max\_lum, m\_a\_T)}{Max\_lum}}{1 - \dfrac{H(Max\_lum, m\_a\_T)}{Max\_lum}}, \text{ where}$$

$$G(L, m\_a) = \left( \frac{K3 \times \left(\frac{L-m\_b}{m\_a}\right)^{\frac{1}{m\_m}}}{m\_p - (K1 \times m\_p - K2) \times \left(\frac{L-m\_b}{m\_a}\right)^{\frac{1}{m\_m}}} \right)^{\frac{1}{m\_n}}, \text{ or}$$

$$G(L, m\_a) = \left( \frac{K3 \times \left(\frac{L}{m\_a}\right)^{\frac{1}{m\_m}}}{m\_p - (K1 \times m\_p - K2) \times \left(\frac{L}{m\_a}\right)^{\frac{1}{m\_m}}} \right)^{\frac{1}{m\_n}}.$$

L is an input signal, G(L) is an inverse function of a function H(L) corresponding to a tone mapping curve, m_a, m_b, m_m, m_n, k1, k2, and k3 are curve parameters, G(L, m_a_T) indicates a G(L) value corresponding to an input variable L when a value of a parameter M_a of G(L) is m_a_T, H(L, m_a_T) is similar, N1 and N2 are rational numbers, max(a, b) indicates calculating a larger value of a and b, min(a, b) indicates calculating a smaller value of a and b, and H(L) is $$H(L) = m\_a \times \left( \frac{m\_p \times L^{m\_n}}{(K1 \times m\_p - K2) \times L^{m\_n} + K3} \right)^{m\_m} + m\_b, \text{ or}$$

$$H(L) = m\_a \times \left( \frac{m\_p \times L^{m\_n}}{(K1 \times m\_p - K2) \times L^{m\_n} + K3} \right)^{m\_m}.$$

In some embodiments of this application, the second parameter includes a cubic spline curve parameter. The cubic spline curve parameter includes interpolation point values TH1[1], TH2[1], and TH3[1] of a cubic spline on the second tone mapping curve. TH1[1] indicates a minimum value of a luminance value of first range pixel of the cubic spline. TH2[1] indicates a maximum value of the luminance value of the first range pixel of the cubic spline and a minimum value of a luminance value of second range pixel of the cubic spline. TH3[1] indicates a maximum value of the luminance value of the second range pixel of the cubic spline.

In some embodiments of this application, the interpolation point values TH1[1], TH2[1], and TH3[1] of the cubic spline are obtained based on the second linear spline curve parameter TH3[0] in the first parameter and preset offset values of the interpolation point values TH1[1], TH2[1], and TH3[1], as shown in the following:

$$TH1[1]=TH3[0],$$

$$TH2[1]=TH1[1]+B, \text{ and}$$

$$TH3[1]=TH2[1]+C*TH2[1]-D*TH1[1].$$

B, C, and D are preset values of correlation values for calculating the interpolation point values TH1[1], TH2[1], and TH3[1] of the cubic spline. B is a preset offset value corresponding to a luminance value of a dark-bright transition region pixel. C and D are preset weighting coefficients corresponding to a luminance value of a bright region pixel.

In some embodiments of this application, the interpolation point values TH1[1], TH2[1], and TH3[1] of the cubic spline are calculated based on the second linear spline curve parameter TH3[0] in the first parameter and correlation values for calculating the interpolation point values TH1[1], TH2[1], and TH3[1], as shown in the following:

$$TH1[1]=3\text{Spline\_}TH[i][0][w],$$

$$TH2[1]=3\text{Spline\_}TH[i][0][w]+3\text{Spline\_}TH\_\text{Delta1}[i][1][w], \text{ and}$$

$$TH3[1]=3\text{Spline\_}TH[i][0][w]+3\text{Spline\_}TH\_\text{Delta1}[i][1][w]+3\text{Spline\_}TH\_\text{Delta1}[i][2][w].$$

3Spline_TH[i][0][w], 3Spline_TH_Delta1[i][1][w], and 3Spline_TH_Delta1[i][2][w] are the correlation values that are used for calculating the interpolation point values TH1[1], TH2[1], and TH3[1] and that are extracted from metadata.

In some embodiments of this application, a Y coordinate of a linear spline on the second tone mapping curve at TH3[0] is the same as a Y coordinate of the cubic spline on the second tone mapping curve at TH1[1], and a first-order derivative of the linear spline at TH3[0] is the same as a first-order derivative of the cubic spline at TH1[1].

In some embodiments of this application, a Y coordinate of a first cubic spline on the second tone mapping curve at TH2[1] is the same as a Y coordinate of a second cubic spline on the second tone mapping curve at TH2[1], and a first-order derivative of the first cubic spline at TH2[1] is the same as a first-order derivative of the second cubic spline at TH2[1].

In some embodiments of this application, a Y coordinate of the second cubic spline on the second tone mapping curve at TH3[1] is the same as a Y coordinate of a third tone mapping function on the second tone mapping curve at TH3[1], and a first-order derivative of the second cubic spline at TH3[1] is the same as a first-order derivative of the third tone mapping function at TH3[1].

In some embodiments of this application, the obtaining unit 1010 is configured to:

obtain the metadata of the image data; and determine the first parameter of the first tone mapping curve based on the metadata and the display parameter.

FIG. 11 is a schematic diagram of a hardware structure of a dynamic range mapping apparatus 1100 according to an embodiment of this application. The apparatus 1100 shown in FIG. 11 may be considered as a computer device. The apparatus 1100 may be used as an implementation of the dynamic range mapping apparatus in embodiments of this application, or may be used as an implementation of the dynamic range mapping method in embodiments of this application. The apparatus 1100 includes a processor 1101, a memory 1102, an input/output interface 1103, and a bus 1105, and may further include a communication interface 1104. The processor 1101, the memory 1102, the input/output interface 1103, and the communication interface 1104 implement a communication connection to each other by using the bus 1105.

The processor 1101 may be a general-purpose central processing unit (CPU), a microprocessor, an application-specific integrated circuit (ASIC), or one or more integrated circuits. The processor 1101 is configured to execute a related program to implement functions that need to be executed by modules in the media data processing apparatus in embodiments of this application, or to perform the media data processing method in the method embodiments of this application. The processor 1101 may be an integrated circuit chip and has a signal processing capability. In an implementation process, the operations in the foregoing method may be completed by using an integrated logic circuit of hardware in the processor 1101 or an instruction in a form of software. The processor 1101 may be a general-purpose processor, a digital signal processor (DSP), an ASIC, a field programmable gate array (FPGA), another programmable logic device, a discrete gate, a transistor logic device, or a discrete hardware component. The processor may implement or perform the method, the operations, and the logical block diagrams that are disclosed in embodiments of this application. The general-purpose processor may be a microprocessor, or the processor may be any conventional processor or the like. The operations of the method disclosed with reference to embodiments of this application may be directly performed and completed by a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1102. The processor 1101 reads information in the memory 1102, and completes, in combination with hardware of the processor 1101, a function that needs to be executed by a module included in the media data processing apparatus in embodiments of this application, or performs the media data processing method in the method embodiments of this application.

The memory 1102 may be a read-only memory (ROM), a static storage device, a dynamic storage device, or a random access memory (RAM). The memory 1102 may store an operating system and another application program. When the functions that need to be executed by the modules that are included in the media data processing apparatus in embodiments of this application are implemented or the media data processing method in the method embodiments of this application is performed by using software or firmware, program code used to implement the technical solutions provided in embodiments of this application is stored in the memory 1102, and the processor 1101 performs operations that need to be performed by the modules that are included in the media data processing apparatus, or performs the media data processing method provided in the method embodiments of this application.

The input/output interface 1103 is configured to receive input data and information, and output data such as an operation result.

The communication interface 1104 uses a transceiver apparatus, for example, but not limited to, a transceiver, to implement communication between the apparatus 1100 and another device or a communication network. The communication interface 1104 may be used as an obtaining module or a sending module in the processing apparatus.

The bus 1105 may include a path for transmitting information between components (for example, the processor 1101, the memory 1102, the input/output interface 1103, and the communication interface 1104) of the apparatus 1100.

It should be noted that, although only the processor 1101, the memory 1102, the input and output interface 1103, the communication interface 1104, and the bus 1105 that are of the apparatus 1100 are shown in FIG. 11, in an embodiment, a person skilled in the art should understand that the apparatus 1100 further includes another device required for implementing normal running, for example, may further include a display that is configured to display to-be-played video data. In addition, based on a specific requirement, a person skilled in the art should understand that the apparatus 1100 may further include hardware components for implementing other additional functions. In addition, a person skilled in the art should understand that the apparatus 1100 may alternatively include only components required for implementing this embodiment of this application, but not necessarily include all the components shown in FIG. 11.

A person of ordinary skill in the art may be aware that, in combination with the examples described in embodiments disclosed in this specification, units and algorithm operations may be implemented by electronic hardware or a combination of computer software and electronic hardware. Whether the functions are performed by using hardware or software depends on particular applications and design constraints of technical solutions. A person skilled in the art may use different methods to implement the described functions for each particular application, but it should not be considered that the implementation goes beyond the scope of this application.

An embodiment of this application further provides a computer-readable storage medium. The computer-readable storage medium stores instructions, and when the instructions are run on a computer, the computer is enabled to perform the foregoing dynamic range mapping method.

An embodiment of this application further provides a computer program product including instructions. When the computer program product runs on a computer, the computer is enabled to perform the foregoing dynamic range mapping method.

A person of ordinary skill in the art may be aware that, in combination with the examples described in embodiments disclosed in this specification, units and algorithm operations may be implemented by electronic hardware or a combination of computer software and electronic hardware. Whether the functions are performed by using hardware or software depends on particular applications and design constraints of technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one location, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, a network device or the like) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A dynamic range mapping method, comprising:
obtaining a display parameter of a terminal device;
obtaining feature information of image data;
obtaining a first parameter of a first tone mapping curve of the image data, wherein the first parameter comprises a second linear spline curve parameter, the second linear spline curve parameter comprises a slope MB_mid[0][0] of a second linear spline on the first tone mapping curve and/or a maximum value TH3_mid[0] of a luminance value of a range pixel of the second linear spline, the display parameter comprises maximum display luminance MaxDisplay of the terminal device, and the feature information comprises a maximum luminance correction value max_lum of the image data;

when a preset condition is met, obtaining a second parameter of a second tone mapping curve based on the first parameter, the display parameter of the terminal device, and the feature information of the image data, the obtaining the second parameter of the second tone mapping curve based on the first parameter, the display parameter, and the feature information further comprising:
adjusting the curve parameters MB_mid[0][0] and TH3_mid[0] based on the maximum display luminance MaxDisplay and the maximum luminance correction value max_lum to obtain the curve parameters MB[0][0] and TH3[0]; and performing dynamic range mapping on the image data based on the second parameter of the second tone mapping curve.

2. The method according to claim 1, wherein the preset condition comprises:
a parameter $a_{P1}$ the first parameter is greater than a value Ta, wherein the value Ta is obtained based on $p_{P1}$ in the first parameter and a preset correspondence between Ta and $p_{P1}$.

3. The method according to claim 1, wherein the second parameter comprises a first linear spline curve parameter, and the first linear spline curve parameter comprises the MB[0][0] which is a slope of a first linear spline on the second tone mapping curve and/or the TH3[0] which is a maximum value of a luminance value of a range pixel of the first linear spline and/or an intersection point base_offset of the first linear spline and a vertical coordinate axis.

4. The method according to claim 1, wherein the curve parameters MB_mid[0][0] and TH3_mid[0], and the curve parameters MB[0][0] and TH3[0] satisfy:

$$MB[0][0]=\min(\max(MB\_mid[0][0]+(1-MB\_mid[0][0])*(WA)^{N1}, MB\_mid[0][0]), 1),$$

and $$TH3[0]=\min(\max(TH3\_mid[0]+(\max\_lum-TH3\_mid[0])*(WA)^{N2}, TH3\_mid[0]), 1),$$

wherein $$WA = \frac{\dfrac{MaxDisplay}{\max\_lum} - \dfrac{MaxDisplay}{G(MaxDisplay, m\_a\_T)}}{1 - \dfrac{MaxDisplay}{G(MaxDisplay, m\_a\_T)}},$$

$$G(L, m\_a) = \left( \frac{K3 \times \left(\dfrac{L-m\_b}{m\_a}\right)^{\frac{1}{m\_m}}}{m\_p - (K1 \times m\_p - K2) \times \left(\dfrac{L-m\_b}{m\_a}\right)^{\frac{1}{m\_m}}} \right)^{\frac{1}{m\_n}}, \text{ or}$$

$$G(L, m\_a) = \left( \frac{K3 \times \left(\dfrac{L}{m\_a}\right)^{\frac{1}{m\_m}}}{m\_p - (K1 \times m\_p - K2) \times \left(\dfrac{L}{m\_a}\right)^{\frac{1}{m\_m}}} \right)^{\frac{1}{m\_n}}, \text{ wherein}$$

a function H(L) corresponds to a tone mapping curve, m_a, m_b, m_m, m_n, k1, k2, and k3 are curve parameters, H(L,m_a_T) indicates a H(L) value corresponding to an input variable L when a value of a parameter M_a of H(L) is m_a_T, N1 and N2 are rational numbers, max(a, b) indicates calculating a larger value of a and b, min(a, b) indicates calculating a smaller value of a and b, and H(L) is $$H(L) = \text{m\_a} \times \left( \frac{\text{m\_p} \times L^{m\_n}}{(K1 \times \text{m\_p} - K2) \times L^{m\_n} + K3} \right)^{m\_m} + \text{m\_b, or}$$

$$H(L) = \text{m\_a} \times \left( \frac{\text{m\_p} \times L^{m\_n}}{(K1 \times \text{m\_p} - K2) \times L^{m\_n} + K3} \right)^{m\_m}.$$

5. The method according to claim 1, wherein the second parameter comprises a cubic spline curve parameter, and the cubic spline curve parameter comprises interpolation point values TH1[1], TH2[1], and TH3[1] of a cubic spline on the second tone mapping curve, wherein TH1[1] indicates a minimum value of a luminance value of a first range pixel of the cubic spline, TH2[1] indicates a maximum value of the luminance value of the first range pixel of the cubic spline and a minimum value of a luminance value of a second range pixel of the cubic spline, and TH3[1] indicates a maximum value of the luminance value of the second range pixel of the cubic spline.

6. The method according to claim 1, wherein the obtaining a first parameter of a first tone mapping curve of the image data comprises:
   obtaining metadata of the image data; and
   determining the first parameter of the first tone mapping curve based on the metadata and the display parameter.

7. A dynamic range mapping apparatus, comprising:
   at least one processor; and
   at least one memory coupled to the at least one processor and storing instructions, which when executed by the at least one processor, cause the at least one processor to:
   obtain a display parameter of a terminal device,
   obtain feature information of image data; and
   obtain a first parameter of a first tone mapping curve of the image data, wherein the first parameter comprises a second linear spline curve parameter, the second linear spline curve parameter comprises a slope MB_mid[0][0] of a second linear spline on the first tone mapping curve and/or a maximum value TH3_mid[0] of a luminance value of a range pixel of the second linear spline, the display parameter comprises maximum display luminance MaxDisplay of the terminal device, and the feature information comprises a maximum luminance correction value max_lum of the image data;
   when a preset condition is met, obtain a second parameter of a second tone mapping curve based on the first parameter, the display parameter of the terminal device, and the feature information of the image data, including adjusting the curve parameters MB_mid[0][0] and TH3_mid[0] based on the maximum display luminance MaxDisplay and the maximum luminance correction value max_lum to obtain the curve parameters MB[0][0] and TH3_[0]; and
   perform dynamic range mapping on the image data based on the second parameter of the second tone mapping curve.

8. The apparatus according to claim 7, wherein the preset condition comprises:
   a parameter $a_{P1}$ in the first parameter is greater than a value Ta, wherein the value Ta is obtained based on $p_{P1}$ in the first parameter and a preset correspondence between Ta and $p_{P1}$.

9. The apparatus according to claim 7, wherein the second parameter comprises a first linear spline curve parameter, and the first linear spline curve parameter comprises the MB[0][0] which is a slope of a first linear spline and/or the TH3[0] which is a maximum value of a luminance value of a range pixel of the first linear spline and/or an intersection point base_offset of the first linear spline and a vertical coordinate axis.

10. The apparatus according to claim 7, wherein the curve parameters MB_mid[0][0] and TH3_mid[0], and the curve parameters MB[0][0] and TH3[0] satisfy:

$$MB[0][0] = \min(\max(MB\_\text{mid}[0][0] + (1 - MB\_\text{mid}[0][0]) * (WA)^{N1}, MB\_\text{mid}[0][0]), 1)$$

and $$TH3[0] = \min(\max(TH3\_\text{mid}[0] + (\max\_\text{lum} - TH3\_\text{mid}[0]) * (WA)^{N2}, TH3\_\text{mid}[0]), 1),$$

wherein $$WA = \frac{\frac{MaxDisplay}{\max\_\text{lum}} - \frac{MaxDisplay}{G(MaxDisplay, \text{m\_a\_T})}}{1 - \frac{MaxDisplay}{G(MaxDisplay, \text{m\_a\_T})}},$$

$$G(L, \text{m\_a}) = \left( \frac{K3 \times \left(\frac{L - \text{m\_b}}{\text{m\_a}}\right)^{\frac{1}{m\_m}}}{\text{m\_p} - (K1 \times \text{m\_p} - K2) \times \left(\frac{L - \text{m\_b}}{\text{m\_a}}\right)^{\frac{1}{m\_m}}} \right)^{\frac{1}{m\_n}}, \text{ or}$$

$$G(L, \text{m\_a}) = \left( \frac{K3 \times \left(\frac{L}{\text{m\_a}}\right)^{\frac{1}{m\_m}}}{\text{m\_p} - (K1 \times \text{m\_p} - K2) \times \left(\frac{L}{\text{m\_a}}\right)^{\frac{1}{m\_m}}} \right)^{\frac{1}{m\_n}}, \text{ wherein}$$

a function H(L) corresponds to a tone mapping curve, m_a, m_b, m_m, m_n, k1, k2, and k3 are curve parameters, H(L, m_a_T) indicates a H(L) value corresponding to an input variable L when a value of a parameter M_a of H(L) is m_a_T, N1 and N2 are rational numbers, max(a, b) indicates calculating a larger value of a and b, min(a, b) indicates calculating a smaller value of a and b, and H(L) is $$H(L) = \text{m\_a} \times \left( \frac{\text{m\_p} \times L^{m\_n}}{(K1 \times \text{m\_p} - K2) \times L^{m\_n} + K3} \right)^{m\_m} + \text{m\_b, or}$$

$$H(L) = \text{m\_a} \times \left( \frac{\text{m\_p} \times L^{m\_n}}{(K1 \times \text{m\_p} - K2) \times L^{m\_n} + K3} \right)^{m\_m}.$$

11. The apparatus according to claim 7, wherein the second parameter comprises a cubic spline curve parameter, and the cubic spline curve parameter comprises interpolation point values TH1[1], TH2[1], and TH3[1] of a cubic spline on the second tone mapping curve, wherein TH1[1] indicates a minimum value of a luminance value of a first range pixel of the cubic spline, TH2[1] indicates a maximum value of the luminance value of the first range pixel of the cubic spline and a minimum value of a luminance value of a second range pixel of the cubic spline, and TH3[1] indicates a maximum value of the luminance value of the second range pixel of the cubic spline.

12. The apparatus according to claim 7, wherein the at least one processor is configured to:
  obtain metadata of the image data; and
  determine the first parameter of the first tone mapping curve based on the metadata and the display parameter.

13. A non-transitory computer-readable storage medium, comprising a computer program, wherein when executed on a computer or by a processor, cause the computer or the processor to perform:
  obtaining a display parameter of a terminal device;
  obtaining feature information of image data;
  obtaining a first parameter of a first tone mapping curve of the image data, wherein the first parameter comprises a second linear spline curve parameter, the second linear spline curve parameter comprises a slope MB_mid[0][0] of a second linear spline on the first tone mapping curve and/or a maximum value TH3_mid[0] of a luminance value of a range pixel of the second linear spline, the display parameter comprises maximum display luminance MaxDisplay of the terminal device, and the feature information comprises a maximum luminance correction value max_lum of the image data;
  when a preset condition is met, obtaining a second parameter of a second tone mapping curve based on the first parameter, the display parameter of the terminal device, and the feature information of the image data, including adjusting the curve parameters MB_mid[0][0] and TH3_mid[0] based on the maximum display luminance MaxDisplay and the maximum luminance correction value max_lum to obtain the curve parameters MB[0][0] and TH3[0]; and
  performing dynamic range mapping on the image data based on the second parameter of the second tone mapping curve.

14. The non-transitory computer-readable storage medium according to claim 13, wherein the preset condition comprises:
  a parameter $a_{P1}$ in the first parameter is greater than a value Ta, wherein the value Ta is obtained based on $p_{P1}$ in the first parameter and a preset correspondence between Ta and $p_{P1}$.

15. The non-transitory computer-readable storage medium according to claim 13, wherein the second parameter comprises a first linear spline curve parameter, and the first linear spline curve parameter comprises the MB[0][0] which is a slope of a first linear spline on the second tone mapping curve and/or the TH3[0] which is a maximum value of a luminance value of a range pixel of the first linear spline and/or an intersection point base_offset of the first linear spline and a vertical coordinate axis.

16. The non-transitory computer-readable storage medium according to claim 13, wherein the curve parameters MB_mid[0][0] and TH3_mid[0], and the curve parameters MB[0][0] and TH3[0] satisfy:

$$MB[0][0]=\min(\max(MB\_mid[0][0]+(1-MB\_mid[0][0])*(WA)^{N1}, MB\_mid[0][0]),1),$$

and $$TH3[0]=\min(\max(TH3\_mid[0]+(\max\_lum-TH3\_mid[0])*(WA)^{N2}, TH3\_mid[0]),1),$$

wherein $$WA = \frac{\dfrac{MaxDisplay}{\max\_lum} - \dfrac{MaxDisplay}{G(MaxDisplay, m\_a\_T)}}{1 - \dfrac{MaxDisplay}{G(MaxDisplay, m\_a\_T)}},$$

$$G(L, m\_a) = \left(\frac{K3 \times \left(\frac{L-m\_b}{m\_a}\right)^{\frac{1}{m\_m}}}{m\_p - (K1 \times m\_p - K2) \times \left(\frac{L-m\_b}{m\_a}\right)^{\frac{1}{m\_m}}}\right)^{\frac{1}{m\_n}}, \text{ or}$$

$$G(L, m\_a) = \left(\frac{K3 \times \left(\frac{L}{m\_a}\right)^{\frac{1}{m\_m}}}{m\_p - (K1 \times m\_p - K2) \times \left(\frac{L}{m\_a}\right)^{\frac{1}{m\_m}}}\right)^{\frac{1}{m\_n}}, \text{ wherein}$$

a function H(L) corresponds to a tone mapping curve, m_a, m_b, m_m, m_n, k1, k2, and k3 are curve parameters, H(L, m_a_T) indicates a H(L) value corresponding to an input variable L when a value of a parameter M_a of H(L) is m_a_T, N1 and N2 are rational numbers, max(a, b) indicates calculating a larger value of a and b, min (a, b) indicates calculating a smaller value of a and b, and H(L) is $$H(L) = m\_a \times \left(\frac{m\_p \times L^{m\_n}}{(K1 \times m\_p - K2) \times L^{m\_n} + K3}\right)^{m\_m} + m\_b, \text{ or}$$

$$H(L) = m\_a \times \left(\frac{m\_p \times L^{m\_n}}{(K1 \times m\_p - K2) \times L^{m\_n} + K3}\right)^{m\_m}.$$

17. The non-transitory computer-readable storage medium according to claim 13, wherein the computer or the processor is further configured to:
  obtain metadata of the image data; and
  determine the first parameter of the first tone mapping curve based on the metadata and the display parameter.

* * * * *